(12) United States Patent
Prasad et al.

(10) Patent No.: US 10,380,562 B1
(45) Date of Patent: Aug. 13, 2019

(54) SYSTEMS AND METHODS FOR MOBILE DEPOSIT OF NEGOTIABLE INSTRUMENTS

(75) Inventors: Bharat Prasad, San Antonio, TX (US); Michael Frank Morris, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 691 days.

(21) Appl. No.: 12/195,723

(22) Filed: Aug. 21, 2008

Related U.S. Application Data

(60) Provisional application No. 61/026,977, filed on Feb. 7, 2008.

(51) Int. Cl.
*G06Q 20/20* (2012.01)
*G06Q 40/02* (2012.01)
*G06Q 20/10* (2012.01)

(52) U.S. Cl.
CPC ........... *G06Q 20/10* (2013.01); *G06Q 20/204* (2013.01); *G06Q 40/025* (2013.01)

(58) Field of Classification Search
USPC ............................................ 705/35; 235/435
See application file for complete search history.

(56) References Cited

U.S. PATENT DOCUMENTS

| | | |
|---|---|---|
| 1,748,489 A | 2/1930 | McCarthy et al. |
| 2,292,825 A | 8/1942 | Dilks et al. |
| 3,005,282 A | 10/1961 | Christiansen |
| 3,341,820 A | 9/1967 | Grillmeier, Jr. |
| 3,576,972 A | 5/1971 | Wood |
| 3,593,913 A | 7/1971 | Bremer |
| 3,620,553 A | 11/1971 | Donovan |
| 3,648,242 A * | 3/1972 | Grosbard ............... 235/435 |
| 3,800,124 A | 3/1974 | Walsh |
| 3,816,943 A | 6/1974 | Henry |
| 4,002,356 A | 1/1977 | Weidmann |
| 4,027,142 A | 5/1977 | Paup et al. |
| 4,060,711 A | 11/1977 | Buros |
| 4,070,649 A | 1/1978 | Wright, Jr. et al. |
| 4,128,202 A | 12/1978 | Buros |

(Continued)

FOREIGN PATENT DOCUMENTS

| | | |
|---|---|---|
| EP | 0 984 410 | 3/2000 |
| EP | 984410 A1 | 3/2000 |

(Continued)

OTHER PUBLICATIONS

Non-Final Office Action dated Dec. 30, 2008 for co-pending U.S. Appl. No. 121195,732, filed Aug. 21, 2008.*

(Continued)

*Primary Examiner* — Leland Marcus
(74) *Attorney, Agent, or Firm* — Brinks Gilson & Lione

(57) ABSTRACT

An image of a negotiable instrument may be taken by a camera associated with a mobile device and provided from a user to a financial institution via the mobile device. The negotiable instrument may be deposited in a user's bank account based on the image. Any technique for sending the image to the financial institution may be used. The mobile device may process the image prior to sending the image to the financial institution. Additionally or alternatively, the financial institution may process the image.

19 Claims, 8 Drawing Sheets

(56) References Cited

U.S. PATENT DOCUMENTS

| | | |
|---|---|---|
| 4,136,471 A | 1/1979 | Austin |
| 4,205,780 A | 6/1980 | Burns |
| 4,264,808 A | 4/1981 | Owens |
| 4,305,216 A | 12/1981 | Skelton |
| 4,321,672 A | 3/1982 | Braun |
| 4,346,442 A | 8/1982 | Musmanno |
| 4,417,136 A | 11/1983 | Rushby et al. |
| 4,433,436 A | 2/1984 | Carnes |
| 4,454,610 A | 6/1984 | Sziklai |
| RE31,692 E | 10/1984 | Tyburski et al. |
| 4,523,330 A | 6/1985 | Grosbard |
| 4,636,099 A | 1/1987 | Goldstone |
| 4,640,413 A | 2/1987 | Kaplan |
| 4,644,144 A | 2/1987 | Chandek |
| 4,722,444 A | 2/1988 | Murphy |
| 4,722,544 A | 2/1988 | Weber |
| 4,727,435 A | 2/1988 | Donovan |
| 4,737,911 A | 4/1988 | Freeman |
| 4,739,411 A | 4/1988 | Bolton |
| 4,774,574 A | 9/1988 | Daly et al. |
| 4,774,663 A | 9/1988 | Musmanno |
| 4,790,475 A | 12/1988 | Griffin |
| 4,806,780 A | 2/1989 | Yamamoto |
| 4,837,693 A | 6/1989 | Schotz |
| 4,890,228 A | 12/1989 | Longfield |
| 4,927,071 A | 5/1990 | Wood |
| 4,934,587 A | 6/1990 | Mcnabb |
| 4,960,981 A | 10/1990 | Benton |
| 4,975,735 A | 12/1990 | Bright |
| 5,022,683 A | 6/1991 | Barbour |
| 5,053,607 A | 10/1991 | Carlson |
| 5,077,805 A | 12/1991 | Tan |
| 5,091,968 A | 2/1992 | Higgins et al. |
| 5,122,950 A | 6/1992 | Benton et al. |
| 5,134,564 A | 7/1992 | Dunn et al. |
| 5,146,606 A | 9/1992 | Grondalski |
| 5,157,620 A | 10/1992 | Shaar |
| 5,159,548 A | 10/1992 | Caslavka |
| 5,164,833 A | 11/1992 | Aoki |
| 5,175,682 A | 12/1992 | Higashiyama et al. |
| 5,187,750 A | 2/1993 | Behera |
| 5,191,525 A | 3/1993 | LeBrun |
| 5,193,121 A | 3/1993 | Elischer et al. |
| 5,220,501 A | 6/1993 | Lawlor |
| 5,227,863 A | 7/1993 | Bilbrey et al. |
| 5,229,589 A | 7/1993 | Schneider |
| 5,233,547 A | 8/1993 | Kapp et al. |
| 5,237,158 A | 8/1993 | Kern et al. |
| 5,237,159 A | 8/1993 | Stephens |
| 5,237,620 A | 8/1993 | Deaton et al. |
| 5,257,320 A | 10/1993 | Etherington et al. |
| 5,265,008 A | 11/1993 | Benton |
| 5,268,968 A | 12/1993 | Yoshida |
| 5,283,829 A | 2/1994 | Anderson |
| 5,321,816 A | 6/1994 | Rogan |
| 5,345,090 A | 9/1994 | Hludzinski |
| 5,347,302 A | 9/1994 | Simonoff |
| 5,350,906 A | 9/1994 | Brody |
| 5,373,550 A | 12/1994 | Campbell |
| 5,383,113 A | 1/1995 | Kight et al. |
| 5,419,588 A | 5/1995 | Wood |
| 5,422,467 A | 6/1995 | Graef |
| 5,444,616 A | 8/1995 | Nair et al. |
| 5,444,794 A | 8/1995 | Uhland, Sr. |
| 5,455,875 A | 10/1995 | Chevion et al. |
| 5,475,403 A | 12/1995 | Havlovick et al. |
| 5,504,538 A | 4/1996 | Tsujihara |
| 5,504,677 A | 4/1996 | Pollin |
| 5,528,387 A | 6/1996 | Kelly et al. |
| 5,530,773 A | 6/1996 | Thompson |
| 5,577,179 A | 11/1996 | Blank |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,631,984 A | 5/1997 | Graf et al. |
| 5,668,897 A | 9/1997 | Stolfo |
| 5,673,320 A | 9/1997 | Ray |
| 5,677,955 A | 10/1997 | Doggett |
| 5,678,046 A | 10/1997 | Cahill et al. |
| 5,679,938 A | 10/1997 | Templeton |
| 5,680,611 A | 10/1997 | Rail |
| 5,691,524 A | 11/1997 | Josephson |
| 5,699,452 A | 12/1997 | Vaidyanathan |
| 5,734,747 A | 3/1998 | Vaidyanathan |
| 5,737,440 A | 4/1998 | Kunkler |
| 5,748,780 A | 5/1998 | Stolfo |
| 5,751,842 A | 5/1998 | Riach |
| 5,761,686 A | 6/1998 | Bloomberg |
| 5,784,503 A | 7/1998 | Bleecker, III et al. |
| 5,830,609 A | 11/1998 | Warner |
| 5,832,463 A | 11/1998 | Funk |
| 5,838,814 A | 11/1998 | Moore |
| 5,848,185 A | 12/1998 | Koga et al. |
| 5,859,935 A | 1/1999 | Johnson et al. |
| 5,863,075 A | 1/1999 | Rich |
| 5,870,456 A | 2/1999 | Rogers |
| 5,870,724 A | 2/1999 | Lawlor |
| 5,870,725 A | 2/1999 | Bellinger et al. |
| 5,878,337 A | 3/1999 | Joao |
| 5,889,884 A | 3/1999 | Hashimoto et al. |
| 5,893,101 A | 4/1999 | Balogh et al. |
| 5,897,625 A | 4/1999 | Gustin |
| 5,898,157 A | 4/1999 | Mangili et al. |
| 5,901,253 A | 5/1999 | Tretter |
| 5,903,878 A | 5/1999 | Talati |
| 5,903,881 A | 5/1999 | Schrader |
| 5,910,988 A | 6/1999 | Ballard |
| 5,917,931 A | 6/1999 | Kunkler |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin |
| 6,012,048 A | 1/2000 | Gustin |
| 6,014,454 A | 1/2000 | Kunkler |
| 6,021,202 A | 2/2000 | Anderson |
| 6,021,397 A | 2/2000 | Jones |
| 6,023,705 A | 2/2000 | Bellinger et al. |
| 6,029,887 A | 2/2000 | Furuhashi |
| 6,030,000 A | 2/2000 | Diamond |
| 6,032,137 A | 2/2000 | Ballard |
| 6,038,553 A | 3/2000 | Hyde |
| 6,053,405 A | 4/2000 | Irwin, Jr. et al. |
| 6,059,185 A | 5/2000 | Funk et al. |
| 6,064,762 A | 5/2000 | Haenel |
| 6,072,941 A | 6/2000 | Suzuki et al. |
| 6,073,119 A | 6/2000 | Bornemisza-wahr |
| 6,073,121 A | 6/2000 | Ramzy |
| 6,085,168 A | 7/2000 | Mori |
| 6,086,708 A | 7/2000 | Colgate |
| 6,089,450 A | 7/2000 | Koeple |
| 6,089,610 A | 7/2000 | Greene |
| 6,092,047 A | 7/2000 | Hyman et al. |
| 6,097,834 A | 8/2000 | Krouse |
| 6,097,845 A | 8/2000 | Ng et al. |
| 6,097,885 A | 8/2000 | Rayner |
| 6,105,865 A | 8/2000 | Hardesty |
| 6,128,603 A | 10/2000 | Dent et al. |
| 6,141,339 A | 10/2000 | Kaplan et al. |
| 6,145,738 A | 11/2000 | Stinson |
| 6,148,102 A | 11/2000 | Stolin |
| 6,149,056 A | 11/2000 | Stinson et al. |
| 6,151,409 A | 11/2000 | Chen et al. |
| 6,151,423 A | 11/2000 | Melen |
| 6,151,426 A | 11/2000 | Lee |
| 6,159,585 A | 12/2000 | Rittenhouse |
| 6,170,744 B1 | 1/2001 | Lee |

(56) References Cited

U.S. PATENT DOCUMENTS

| | | |
|---|---|---|
| 6,178,409 B1 | 1/2001 | Weber et al. |
| 6,181,837 B1 | 1/2001 | Cahill et al. |
| 6,188,506 B1 | 2/2001 | Kaiserman |
| 6,189,785 B1 | 2/2001 | Lowery |
| 6,192,165 B1 | 2/2001 | Irons |
| 6,195,694 B1 | 2/2001 | Chen et al. |
| 6,199,055 B1 | 3/2001 | Kara |
| 6,236,009 B1 | 5/2001 | Emigh et al. |
| 6,243,689 B1 | 6/2001 | Norton |
| 6,278,983 B1 | 8/2001 | Ball |
| 6,282,523 B1 | 8/2001 | Tedesco et al. |
| 6,282,826 B1 | 9/2001 | Richards |
| 6,293,469 B1 | 9/2001 | Masson et al. |
| 6,304,860 B1 | 10/2001 | Martin, Jr. |
| 6,310,647 B1 | 10/2001 | Parulski et al. |
| 6,314,452 B1 | 11/2001 | Dekel |
| 6,317,727 B1 | 11/2001 | May |
| 6,328,207 B1 | 12/2001 | Gregoire et al. |
| 6,330,546 B1 | 12/2001 | Gopinathan et al. |
| 6,339,658 B1 | 1/2002 | Moccagatta |
| 6,339,766 B1 | 1/2002 | Gephart |
| 6,351,553 B1 | 2/2002 | Hayosh |
| 6,351,735 B1 | 2/2002 | Deaton et al. |
| 6,354,490 B1 | 3/2002 | Weiss et al. |
| 6,363,162 B1 | 3/2002 | Moed et al. |
| 6,363,164 B1 | 3/2002 | Jones et al. |
| 6,390,362 B1 | 5/2002 | Martin |
| 6,397,196 B1 | 5/2002 | Kravetz |
| 6,408,084 B1 | 6/2002 | Foley |
| 6,411,725 B1 | 6/2002 | Rhoads |
| 6,411,737 B2 | 6/2002 | Wesolkowski et al. |
| 6,411,938 B1 | 6/2002 | Gates et al. |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |
| 6,439,454 B1 | 8/2002 | Masson et al. |
| 6,449,397 B1 | 9/2002 | Che-chu |
| 6,450,403 B1 | 9/2002 | Martens |
| 6,463,220 B1 | 10/2002 | Dance et al. |
| 6,464,134 B1 | 10/2002 | Page |
| 6,469,745 B1 | 10/2002 | Yamada et al. |
| 6,470,325 B1 | 10/2002 | Leemhuis |
| 6,473,519 B1 | 10/2002 | Pidhirny et al. |
| 6,502,747 B1 | 1/2003 | Stoutenburg et al. |
| 6,505,178 B1 | 1/2003 | Flenley |
| 6,546,119 B2 | 4/2003 | Ciolli et al. |
| 6,574,377 B1 | 6/2003 | Cahill et al. |
| 6,574,609 B1 | 6/2003 | Downs |
| 6,578,760 B1 | 6/2003 | Otto |
| 6,587,837 B1 | 7/2003 | Spagna |
| 6,606,117 B1 | 8/2003 | Windle |
| 6,609,200 B2 | 8/2003 | Anderson |
| 6,611,598 B1 | 8/2003 | Hayosh |
| 6,614,930 B1 | 9/2003 | Agnihotri et al. |
| 6,643,416 B1 | 11/2003 | Daniels |
| 6,647,136 B2 | 11/2003 | Jones et al. |
| 6,654,487 B1 | 11/2003 | Downs, Jr. |
| 6,661,910 B2 | 12/2003 | Jones et al. |
| 6,669,086 B2 | 12/2003 | Abdi et al. |
| 6,672,452 B1 | 1/2004 | Alves |
| 6,682,452 B2 | 1/2004 | Quintus |
| 6,695,204 B1 | 2/2004 | Stinson |
| 6,711,474 B1 | 3/2004 | Treyz et al. |
| 6,726,097 B2 * | 4/2004 | Graef et al. ............... 235/379 |
| 6,728,397 B2 | 4/2004 | Mcneal |
| 6,738,496 B1 | 5/2004 | Van Hall |
| 6,742,128 B1 | 5/2004 | Joiner |
| 6,745,186 B1 | 6/2004 | Testa et al. |
| 6,754,640 B2 | 6/2004 | Bozeman |
| 6,755,340 B1 | 6/2004 | Voss |
| 6,760,414 B1 | 7/2004 | Schurko et al. |
| 6,760,470 B1 | 7/2004 | Bogosian et al. |
| 6,763,226 B1 | 7/2004 | McZeal |
| 6,781,962 B1 | 8/2004 | Williams |
| 6,786,398 B1 | 9/2004 | Stinson |
| 6,789,054 B1 | 9/2004 | Makhlouf |
| 6,796,489 B2 | 9/2004 | Slater et al. |
| 6,796,491 B2 | 9/2004 | Nakajima |
| 6,806,903 B1 | 10/2004 | Okisu et al. |
| 6,807,294 B2 | 10/2004 | Yamazaki |
| 6,813,733 B1 | 11/2004 | Li |
| 6,829,704 B2 | 12/2004 | Zhang |
| 6,844,885 B2 | 1/2005 | Anderson |
| 6,856,965 B1 | 2/2005 | Stinson |
| 6,863,214 B2 | 3/2005 | Garner et al. |
| 6,870,947 B2 | 3/2005 | Kelland |
| 6,873,728 B2 | 3/2005 | Bernstein et al. |
| 6,883,140 B1 | 4/2005 | Acker |
| 6,898,314 B2 | 5/2005 | Kung et al. |
| 6,902,105 B2 | 6/2005 | Koakutsu |
| 6,910,023 B1 | 6/2005 | Schibi |
| 6,913,188 B2 | 7/2005 | Wong |
| 6,931,255 B2 | 8/2005 | Mekuria |
| 6,931,591 B1 | 8/2005 | Brown |
| 6,934,719 B2 | 8/2005 | Nally |
| 6,947,610 B2 | 9/2005 | Sun |
| 6,957,770 B1 | 10/2005 | Robinson |
| 6,961,689 B1 | 11/2005 | Greenberg |
| 6,970,843 B1 | 11/2005 | Forte |
| 6,973,589 B2 | 12/2005 | Wright |
| 6,983,886 B2 | 1/2006 | Natsukari et al. |
| 6,993,507 B2 | 1/2006 | Meyer |
| 6,996,263 B2 | 2/2006 | Jones et al. |
| 6,999,943 B1 | 2/2006 | Johnson |
| 7,003,040 B2 | 2/2006 | Yi |
| 7,004,382 B2 * | 2/2006 | Sandru ............... 235/379 |
| 7,010,155 B2 | 3/2006 | Koakutsu et al. |
| 7,010,507 B1 | 3/2006 | Anderson |
| 7,016,704 B2 | 3/2006 | Pallakoff |
| 7,027,171 B1 | 4/2006 | Watanabe |
| 7,028,886 B1 | 4/2006 | Maloney |
| 7,039,048 B1 | 5/2006 | Monta |
| 7,046,991 B2 | 5/2006 | Little |
| 7,051,001 B1 | 5/2006 | Slater |
| 7,058,036 B1 | 6/2006 | Yu |
| 7,062,099 B2 | 6/2006 | Li et al. |
| 7,062,456 B1 | 6/2006 | Riehl et al. |
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,116,446 B2 | 10/2006 | Maurer |
| 7,117,171 B1 | 10/2006 | Pollin |
| 7,120,461 B2 | 10/2006 | Cho |
| 7,131,571 B2 | 11/2006 | Swift et al. |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 | 2/2007 | Buchanan |
| 7,184,980 B2 | 2/2007 | Allen-Rouman et al. |
| 7,185,805 B1 | 3/2007 | McShirley |
| 7,197,173 B2 | 3/2007 | Jones et al. |
| 7,200,255 B2 | 4/2007 | Jones |
| 7,204,412 B2 | 4/2007 | Foss, Jr. |
| 7,216,106 B1 | 5/2007 | Buchanan |
| 7,219,082 B2 | 5/2007 | Forte |
| 7,219,831 B2 | 5/2007 | Murata |
| 7,245,765 B2 | 7/2007 | Myers et al. |
| 7,249,076 B1 | 7/2007 | Pendleton |
| 7,252,224 B2 | 8/2007 | Verma |
| 7,257,246 B1 | 8/2007 | Brodie et al. |
| 7,266,230 B2 | 9/2007 | Doran |
| 7,277,191 B2 | 10/2007 | Metcalfe et al. |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |

(56) References Cited

U.S. PATENT DOCUMENTS

| | | |
|---|---|---|
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 * | 2/2008 | Wu et al. ............... 382/289 |
| 7,331,523 B2 | 2/2008 | Meier et al. |
| 7,336,813 B2 | 2/2008 | Prakash et al. |
| 7,343,320 B1 | 3/2008 | Treyz |
| 7,349,566 B2 | 3/2008 | Jones et al. |
| 7,349,585 B2 | 3/2008 | Li |
| 7,350,697 B2 | 4/2008 | Swift et al. |
| 7,356,505 B2 | 4/2008 | March |
| 7,369,713 B2 | 5/2008 | Suino |
| 7,377,425 B1 | 5/2008 | Ma |
| 7,379,978 B2 | 5/2008 | Anderson |
| 7,383,227 B2 | 6/2008 | Weinflash et al. |
| 7,385,631 B2 | 6/2008 | Maeno |
| 7,386,511 B2 | 6/2008 | Buchanan |
| 7,388,683 B2 | 6/2008 | Rodriguez et al. |
| 7,391,897 B2 | 6/2008 | Jones |
| 7,391,934 B2 | 6/2008 | Goodall et al. |
| 7,392,935 B2 | 7/2008 | Byrne |
| 7,401,048 B2 | 7/2008 | Rosedale |
| 7,403,917 B1 | 7/2008 | Larsen |
| 7,406,198 B2 | 7/2008 | Aoki et al. |
| 7,419,093 B1 | 9/2008 | Blackson et al. |
| 7,421,107 B2 | 9/2008 | Lugg |
| 7,421,410 B1 | 9/2008 | Schechtman et al. |
| 7,427,016 B2 | 9/2008 | Chimento |
| 7,433,098 B2 | 10/2008 | Klein et al. |
| 7,437,327 B2 | 10/2008 | Lam |
| 7,440,924 B2 | 10/2008 | Buchanan |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,460,700 B2 | 12/2008 | Tsunachima et al. |
| 7,461,779 B2 | 12/2008 | Ramachandran |
| 7,461,780 B2 | 12/2008 | Potts |
| 7,464,859 B1 | 12/2008 | Hawkins |
| 7,471,818 B1 | 12/2008 | Price |
| 7,475,040 B2 | 1/2009 | Buchanan |
| 7,477,923 B2 | 1/2009 | Wallmark |
| 7,480,382 B2 * | 1/2009 | Dunbar et al. ............... 380/217 |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Satou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | Degroeve et al. |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 * | 6/2009 | Borrey et al. ............... 358/1.15 |
| 7,548,641 B2 | 6/2009 | Gilson et al. |
| 7,566,002 B2 | 7/2009 | Love et al. |
| 7,571,848 B2 | 8/2009 | Cohen |
| 7,577,614 B1 | 8/2009 | Warren et al. |
| 7,587,066 B2 | 9/2009 | Cordery et al. |
| 7,587,363 B2 | 9/2009 | Cataline |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,609,889 B2 | 10/2009 | Guo et al. |
| 7,619,721 B2 | 11/2009 | Jones |
| 7,620,231 B2 | 11/2009 | Jones |
| 7,620,604 B1 | 11/2009 | Bueche, Jr. |
| 7,630,518 B2 | 12/2009 | Frew et al. |
| 7,644,037 B1 | 1/2010 | Ostrovsky |
| 7,644,043 B2 | 1/2010 | Minowa |
| 7,647,275 B2 | 1/2010 | Jones |
| 7,668,363 B2 | 2/2010 | Price |
| 7,672,022 B1 | 3/2010 | Fan |
| 7,672,940 B2 | 3/2010 | Viola |
| 7,676,409 B1 | 3/2010 | Ahmad |
| 7,680,732 B1 | 3/2010 | Davies et al. |
| 7,680,735 B1 | 3/2010 | Loy |
| 7,689,482 B2 | 3/2010 | Lam |
| 7,697,776 B2 * | 4/2010 | Wu et al. ............... 382/254 |
| 7,698,222 B1 | 4/2010 | Bueche, Jr. |
| 7,702,588 B2 | 4/2010 | Gilder |
| 7,714,778 B2 | 5/2010 | Dupray |
| 7,720,735 B2 | 5/2010 | Anderson et al. |
| 7,734,545 B1 | 6/2010 | Fogliano |
| 7,743,979 B2 | 6/2010 | Fredman |
| 7,753,268 B1 | 7/2010 | Robinson et al. |
| 7,761,358 B2 | 7/2010 | Craig et al. |
| 7,766,244 B1 | 8/2010 | Field |
| 7,769,650 B2 | 8/2010 | Bleunven |
| 7,778,457 B2 | 8/2010 | Nepomniachtchi et al. |
| 7,792,752 B1 | 9/2010 | Kay |
| 7,792,753 B1 | 9/2010 | Slater et al. |
| 7,810,714 B2 | 10/2010 | Murata |
| 7,812,986 B2 | 10/2010 | Graham et al. |
| 7,818,245 B2 | 10/2010 | Prakash et al. |
| 7,831,458 B2 | 11/2010 | Neumann |
| 7,856,402 B1 | 12/2010 | Kay |
| 7,865,384 B2 | 1/2011 | Anderson et al. |
| 7,873,200 B1 | 1/2011 | Oakes, III et al. |
| 7,876,949 B1 | 1/2011 | Oakes et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,895,054 B2 | 2/2011 | Slen et al. |
| 7,896,232 B1 | 3/2011 | Prasad et al. |
| 7,900,822 B1 | 3/2011 | Prasad et al. |
| 7,903,863 B2 | 3/2011 | Jones et al. |
| 7,904,386 B2 | 3/2011 | Kalra et al. |
| 7,912,785 B1 | 3/2011 | Kay |
| 7,935,441 B2 | 5/2011 | Tononishi |
| 7,949,587 B1 | 5/2011 | Morris et al. |
| 7,950,698 B2 | 5/2011 | Popadic et al. |
| 7,953,441 B2 | 5/2011 | Lors |
| 7,958,053 B2 | 6/2011 | Stone |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,979,326 B2 | 7/2011 | Kurushima |
| 7,996,312 B1 | 8/2011 | Beck et al. |
| 7,996,314 B1 | 8/2011 | Smith et al. |
| 7,996,315 B1 | 8/2011 | Smith et al. |
| 7,996,316 B1 | 8/2011 | Smith et al. |
| 8,001,051 B1 | 8/2011 | Smith et al. |
| 8,045,784 B2 | 10/2011 | Price et al. |
| 8,046,301 B1 | 10/2011 | Smith et al. |
| 8,060,442 B1 | 11/2011 | Hecht et al. |
| 8,065,307 B2 | 11/2011 | Haslam et al. |
| 8,091,778 B1 | 1/2012 | Block et al. |
| 8,116,533 B2 | 2/2012 | Kiplinger et al. |
| 8,159,520 B1 | 4/2012 | Dhanoa |
| 8,203,640 B2 | 6/2012 | Kim et al. |
| 8,204,293 B2 | 6/2012 | Csulits et al. |
| 8,235,284 B1 | 8/2012 | Prasad et al. |
| 8,266,076 B2 | 9/2012 | Lopez et al. |
| 8,271,385 B2 | 9/2012 | Emerson et al. |
| 8,290,237 B1 | 10/2012 | Burks et al. |
| 8,313,020 B2 | 11/2012 | Ramachandran |
| 8,320,657 B1 | 11/2012 | Burks et al. |
| 8,332,329 B1 | 12/2012 | Thiele |
| 8,351,677 B1 | 1/2013 | Oakes, III et al. |
| 8,351,678 B1 | 1/2013 | Medina, III |
| 8,358,826 B1 | 1/2013 | Medina et al. |

(56) References Cited

U.S. PATENT DOCUMENTS

| | | |
|---|---|---|
| 8,364,563 B2 | 1/2013 | Choiniere, Sr. |
| 8,369,650 B2 | 2/2013 | Zanfir et al. |
| 8,374,963 B1 | 2/2013 | Billman |
| 8,391,599 B1 | 3/2013 | Medina, III |
| 8,392,332 B1 | 3/2013 | Oakes, III et al. |
| 8,401,962 B1 | 3/2013 | Bent et al. |
| 8,422,758 B1 | 4/2013 | Bueche, Jr. |
| 8,433,127 B1 | 4/2013 | Harpel et al. |
| 8,433,647 B1 | 4/2013 | Yarbrough |
| 8,452,689 B1 | 5/2013 | Medina, III |
| 8,464,933 B1 | 6/2013 | Prasad et al. |
| 8,538,124 B1 | 9/2013 | Harpel et al. |
| 8,542,921 B1 | 9/2013 | Medina |
| 8,548,267 B1 | 10/2013 | Yacoub et al. |
| 8,559,766 B2 | 10/2013 | Tilt et al. |
| 8,582,862 B2 | 11/2013 | Nepomniachtchi et al. |
| 8,611,635 B1 | 12/2013 | Medina, III |
| 8,660,952 B1 | 2/2014 | Viera et al. |
| 8,699,779 B1 | 4/2014 | Prasad et al. |
| 8,708,227 B1 | 4/2014 | Oakes et al. |
| 8,731,321 B2 | 5/2014 | Fujiwara et al. |
| 8,732,081 B1 | 5/2014 | Oakes, III et al. |
| 8,751,345 B1 | 6/2014 | Borzych et al. |
| 8,751,356 B1 | 6/2014 | Garcia |
| 8,751,379 B1 | 6/2014 | Bueche, Jr. |
| 8,799,147 B1 | 8/2014 | Walls et al. |
| 8,837,806 B1 | 9/2014 | Ethington et al. |
| 8,843,405 B1 | 9/2014 | Hartman et al. |
| 8,959,033 B1 | 2/2015 | Oakes et al. |
| 8,977,571 B1 | 3/2015 | Bueche, Jr. et al. |
| 8,990,862 B1 | 3/2015 | Smith |
| 9,009,071 B1 | 4/2015 | Watson et al. |
| 9,036,040 B1 | 5/2015 | Danko |
| 9,058,512 B1 | 6/2015 | Medina |
| 9,064,284 B1 | 6/2015 | Janiszeski et al. |
| 9,129,340 B1 | 8/2015 | Medina, III et al. |
| 9,159,101 B1 | 10/2015 | Pollack et al. |
| 9,177,197 B1 | 11/2015 | Prasad et al. |
| 9,177,198 B1 | 11/2015 | Prasad et al. |
| 9,224,136 B1 | 12/2015 | Oakes, III et al. |
| 9,286,514 B1 | 3/2016 | Newman |
| 9,311,634 B1 | 4/2016 | Hildebrand |
| 9,336,517 B1 | 5/2016 | Prasad et al. |
| 9,390,339 B1 | 7/2016 | Danko |
| 9,401,011 B2 | 7/2016 | Medina, III et al. |
| 9,424,569 B1 | 8/2016 | Sherman et al. |
| 9,569,756 B1 | 2/2017 | Bueche, Jr. et al. |
| 9,619,872 B1 | 4/2017 | Medina, III et al. |
| 9,626,183 B1 | 4/2017 | Smith et al. |
| 9,626,662 B1 | 4/2017 | Prasad et al. |
| 9,779,392 B1 | 10/2017 | Prasad et al. |
| 9,779,452 B1 | 10/2017 | Medina et al. |
| 9,785,929 B1 | 10/2017 | Watson et al. |
| 9,792,654 B1 | 10/2017 | Limas et al. |
| 9,818,090 B1 | 11/2017 | Bueche, Jr. et al. |
| 9,886,642 B1 | 2/2018 | Danko |
| 9,892,454 B1 | 2/2018 | Pollack et al. |
| 9,898,778 B1 | 2/2018 | Pollack et al. |
| 9,898,808 B1 | 2/2018 | Medina, III et al. |
| 9,904,848 B1 | 2/2018 | Newman |
| 9,946,923 B1 | 4/2018 | Medina |
| 10,013,605 B1 | 7/2018 | Oakes, III et al. |
| 10,013,681 B1 | 7/2018 | Oakes, III et al. |
| 10,181,087 B1 | 1/2019 | Danko |
| 10,235,660 B1 | 3/2019 | Bueche, Jr. et al. |
| 2001/0004235 A1 | 6/2001 | Maloney |
| 2001/0014881 A1 | 8/2001 | Drummond |
| 2001/0016084 A1 | 8/2001 | Pollard et al. |
| 2001/0018739 A1 | 8/2001 | Anderson |
| 2001/0027994 A1 | 10/2001 | Hayashida |
| 2001/0037299 A1 | 11/2001 | Nichols et al. |
| 2001/0042171 A1 | 11/2001 | Vermeulen |
| 2001/0042785 A1 | 11/2001 | Walker |
| 2001/0043748 A1 | 11/2001 | Wesolkowski et al. |
| 2001/0047330 A1 | 11/2001 | Gephart |
| 2001/0054020 A1 | 12/2001 | Barth |
| 2002/0001393 A1 | 1/2002 | Jones |
| 2002/0013767 A1 | 1/2002 | Katz |
| 2002/0016763 A1 | 2/2002 | March |
| 2002/0016769 A1 | 2/2002 | Barbara et al. |
| 2002/0023055 A1 | 2/2002 | Antognini et al. |
| 2002/0025085 A1 | 2/2002 | Gustafson et al. |
| 2002/0026418 A1 | 2/2002 | Koppel et al. |
| 2002/0032656 A1 | 3/2002 | Chen |
| 2002/0038289 A1 | 3/2002 | Lawlor et al. |
| 2002/0040340 A1 | 4/2002 | Yoshida |
| 2002/0052841 A1 | 5/2002 | Guthrie |
| 2002/0052853 A1 | 5/2002 | Munoz |
| 2002/0065786 A1 | 5/2002 | Martens |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107767 A1 | 8/2002 | McClair et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0120582 A1 | 8/2002 | Elston et al. |
| 2002/0120846 A1 | 8/2002 | Stewart et al. |
| 2002/0129249 A1 | 9/2002 | Maillard et al. |
| 2002/0130868 A1 | 9/2002 | Smith |
| 2002/0133409 A1 | 9/2002 | Sawano et al. |
| 2002/0138445 A1 | 9/2002 | Laage |
| 2002/0138522 A1 | 9/2002 | Muralidhar |
| 2002/0147798 A1 | 10/2002 | Huang |
| 2002/0150279 A1 | 10/2002 | Scott |
| 2002/0150311 A1 | 10/2002 | Lynn |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta |
| 2002/0152170 A1 | 10/2002 | Dutta |
| 2002/0153414 A1 | 10/2002 | Stoutenburg et al. |
| 2002/0154127 A1 | 10/2002 | Vienneau et al. |
| 2002/0159648 A1 | 10/2002 | Alderson et al. |
| 2002/0169715 A1 | 11/2002 | Ruth et al. |
| 2002/0171820 A1 | 11/2002 | Okamura |
| 2002/0178112 A1 | 11/2002 | Goeller |
| 2002/0186881 A1 | 12/2002 | Li |
| 2002/0188564 A1 | 12/2002 | Star |
| 2002/0195485 A1 | 12/2002 | Pomerleau et al. |
| 2003/0005326 A1 | 1/2003 | Flemming |
| 2003/0009420 A1 | 1/2003 | Jones |
| 2003/0015583 A1 | 1/2003 | Abdi et al. |
| 2003/0018897 A1 | 1/2003 | Bellis, Jr. et al. |
| 2003/0023557 A1 | 1/2003 | Moore |
| 2003/0026609 A1 | 2/2003 | Parulski |
| 2003/0038227 A1 | 2/2003 | Sesek |
| 2003/0050889 A1 | 3/2003 | Burke |
| 2003/0053692 A1 | 3/2003 | Hong et al. |
| 2003/0055756 A1 | 3/2003 | Allan |
| 2003/0055776 A1 | 3/2003 | Samuelson |
| 2003/0072568 A1 | 4/2003 | Lin et al. |
| 2003/0074315 A1 | 4/2003 | Lam |
| 2003/0075596 A1 | 4/2003 | Koakutsu |
| 2003/0075916 A1 | 4/2003 | Gorski |
| 2003/0078883 A1 | 4/2003 | Stewart et al. |
| 2003/0081824 A1 | 5/2003 | Mennie |
| 2003/0086615 A1 | 5/2003 | Dance et al. |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown et al. |
| 2003/0105714 A1 | 6/2003 | Alarcon-Luther et al. |
| 2003/0126078 A1 | 7/2003 | Vihinen |
| 2003/0126082 A1 | 7/2003 | Omura et al. |
| 2003/0130940 A1 | 7/2003 | Hansen et al. |
| 2003/0130958 A1 | 7/2003 | Narayanan et al. |
| 2003/0132384 A1 | 7/2003 | Sugiyama et al. |
| 2003/0133608 A1 | 7/2003 | Bernstein et al. |
| 2003/0133610 A1 | 7/2003 | Nagarajan et al. |

(56) References Cited

U.S. PATENT DOCUMENTS

| | | |
|---|---|---|
| 2003/0135457 A1 | 7/2003 | Stewart et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0187790 A1 | 10/2003 | Swift et al. |
| 2003/0191615 A1 | 10/2003 | Bailey |
| 2003/0191869 A1 | 10/2003 | Williams |
| 2003/0200107 A1 | 10/2003 | Allen et al. |
| 2003/0200174 A1 | 10/2003 | Star |
| 2003/0202690 A1 | 10/2003 | Jones et al. |
| 2003/0212904 A1 | 11/2003 | Randle et al. |
| 2003/0217005 A1 | 11/2003 | Drummond et al. |
| 2003/0218061 A1 | 11/2003 | Filatov |
| 2003/0225705 A1 | 12/2003 | Park et al. |
| 2003/0231285 A1 | 12/2003 | Ferguson |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | De Souza |
| 2004/0013284 A1 | 1/2004 | Yu |
| 2004/0017482 A1 | 1/2004 | Weitman |
| 2004/0024626 A1 | 2/2004 | Bruijning |
| 2004/0024708 A1 | 2/2004 | Masuda |
| 2004/0029591 A1 | 2/2004 | Chapman et al. |
| 2004/0030741 A1 | 2/2004 | Wolton et al. |
| 2004/0044606 A1 | 3/2004 | Buttridge et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0075754 A1 | 4/2004 | Nakajima et al. |
| 2004/0076320 A1 | 4/2004 | Downs, Jr. |
| 2004/0078299 A1* | 4/2004 | Down-Logan et al. ........ 705/27 |
| 2004/0080795 A1 | 4/2004 | Bean |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0111371 A1 | 6/2004 | Friedman |
| 2004/0117302 A1 | 6/2004 | Weichert |
| 2004/0122754 A1 | 6/2004 | Stevens |
| 2004/0133511 A1 | 7/2004 | Smith et al. |
| 2004/0133516 A1 | 7/2004 | Buchanan et al. |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0184766 A1 | 9/2004 | Kim et al. |
| 2004/0201741 A1 | 10/2004 | Ban |
| 2004/0210515 A1 | 10/2004 | Hughes |
| 2004/0210523 A1 | 10/2004 | Gains et al. |
| 2004/0225604 A1 | 11/2004 | Foss, Jr. et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0015332 A1 | 1/2005 | Chen |
| 2005/0015342 A1 | 1/2005 | Murata et al. |
| 2005/0021466 A1 | 1/2005 | Buchanan et al. |
| 2005/0030388 A1 | 2/2005 | Stavely et al. |
| 2005/0033645 A1 | 2/2005 | Duphily |
| 2005/0033685 A1 | 2/2005 | Reyes |
| 2005/0033690 A1 | 2/2005 | Antognini et al. |
| 2005/0033695 A1 | 2/2005 | Minowa |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Shimamura |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0077351 A1 | 4/2005 | De Jong |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0089209 A1 | 4/2005 | Stefanuk |
| 2005/0091161 A1 | 4/2005 | Gustin |
| 2005/0096992 A1 | 5/2005 | Geisel |
| 2005/0097019 A1 | 5/2005 | Jacobs |
| 2005/0097046 A1 | 5/2005 | Singfield |
| 2005/0097050 A1 | 5/2005 | Orcutt |
| 2005/0108164 A1 | 5/2005 | Salafia |
| 2005/0108168 A1 | 5/2005 | Halpin |
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0131820 A1* | 6/2005 | Rodriguez et al. ............. 705/42 |
| 2005/0143136 A1 | 6/2005 | Lev et al. |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177494 A1 | 8/2005 | Kelly et al. |
| 2005/0177499 A1 | 8/2005 | Thomas |
| 2005/0177510 A1 | 8/2005 | Hilt et al. |
| 2005/0177518 A1 | 8/2005 | Brown |
| 2005/0182710 A1 | 8/2005 | Andersson |
| 2005/0188306 A1 | 8/2005 | Mackenzie |
| 2005/0203430 A1 | 9/2005 | Williams et al. |
| 2005/0205661 A1 | 9/2005 | Taylor |
| 2005/0209961 A1 | 9/2005 | Michelsen |
| 2005/0213805 A1 | 9/2005 | Blake et al. |
| 2005/0216410 A1 | 9/2005 | Davis et al. |
| 2005/0218209 A1 | 10/2005 | Heilper et al. |
| 2005/0220324 A1 | 10/2005 | Klein et al. |
| 2005/0228733 A1 | 10/2005 | Bent et al. |
| 2005/0244035 A1 | 11/2005 | Klein et al. |
| 2005/0252955 A1 | 11/2005 | Sugai |
| 2005/0267843 A1 | 12/2005 | Acharya |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0278250 A1 | 12/2005 | Zair |
| 2005/0281448 A1 | 12/2005 | Lugg |
| 2005/0281471 A1 | 12/2005 | LeComte |
| 2005/0281474 A1 | 12/2005 | Huang |
| 2005/0289030 A1 | 12/2005 | Smith |
| 2005/0289059 A1 | 12/2005 | Brewington et al. |
| 2005/0289182 A1 | 12/2005 | Pandian et al. |
| 2006/0002426 A1 | 1/2006 | Madour |
| 2006/0004660 A1 | 1/2006 | Pranger |
| 2006/0015450 A1 | 1/2006 | Guck et al. |
| 2006/0015733 A1 | 1/2006 | O'Malley et al. |
| 2006/0017752 A1 | 1/2006 | Kurzweil et al. |
| 2006/0025697 A1 | 2/2006 | Kurzweil |
| 2006/0039628 A1 | 2/2006 | Li et al. |
| 2006/0039629 A1 | 2/2006 | Li |
| 2006/0041506 A1 | 2/2006 | Mason et al. |
| 2006/0045321 A1 | 3/2006 | Yu |
| 2006/0045374 A1 | 3/2006 | Kim et al. |
| 2006/0045379 A1 | 3/2006 | Heaney, Jr. et al. |
| 2006/0047593 A1 | 3/2006 | Naratil |
| 2006/0049242 A1 | 3/2006 | Mejias et al. |
| 2006/0053056 A1 | 3/2006 | Alspach-Goss |
| 2006/0059085 A1 | 3/2006 | Tucker |
| 2006/0064368 A1 | 3/2006 | Forte |

(56) References Cited

U.S. PATENT DOCUMENTS

| | | |
|---|---|---|
| 2006/0080245 A1 | 4/2006 | Bahl |
| 2006/0085357 A1 | 4/2006 | Pizarro |
| 2006/0085516 A1 | 4/2006 | Farr et al. |
| 2006/0102704 A1 | 5/2006 | Reynders |
| 2006/0103893 A1 | 5/2006 | Azimi et al. |
| 2006/0106691 A1 | 5/2006 | Sheaffer |
| 2006/0106717 A1 | 5/2006 | Randle |
| 2006/0108168 A1 | 5/2006 | Fischer et al. |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu |
| 2006/0118613 A1 | 6/2006 | McMann |
| 2006/0124730 A1 | 6/2006 | Maloney |
| 2006/0144924 A1 | 7/2006 | Stover |
| 2006/0144937 A1 | 7/2006 | Heilper et al. |
| 2006/0144950 A1 | 7/2006 | Johnson |
| 2006/0159367 A1 | 7/2006 | Zeineh et al. |
| 2006/0161499 A1 | 7/2006 | Rich et al. |
| 2006/0161501 A1 | 7/2006 | Waserstein |
| 2006/0164682 A1 | 7/2006 | Lev |
| 2006/0166178 A1 | 7/2006 | Driedijk |
| 2006/0167818 A1 | 7/2006 | Wentker et al. |
| 2006/0181614 A1 | 8/2006 | Yen et al. |
| 2006/0182331 A1 | 8/2006 | Gilson et al. |
| 2006/0182332 A1 | 8/2006 | Weber |
| 2006/0186194 A1 | 8/2006 | Richardson et al. |
| 2006/0202014 A1 | 9/2006 | Vankirk et al. |
| 2006/0206506 A1 | 9/2006 | Fitzpatrick |
| 2006/0208059 A1 | 9/2006 | Cable et al. |
| 2006/0210138 A1 | 9/2006 | Hilton et al. |
| 2006/0212391 A1 | 9/2006 | Norman et al. |
| 2006/0212393 A1 | 9/2006 | Brown |
| 2006/0214940 A1 | 9/2006 | Kinoshita |
| 2006/0215204 A1 | 9/2006 | Miyamoto et al. |
| 2006/0215230 A1* | 9/2006 | Borrey et al. ............... 358/448 |
| 2006/0222260 A1 | 10/2006 | Sambongi et al. |
| 2006/0229976 A1 | 10/2006 | Jung |
| 2006/0229986 A1 | 10/2006 | Corder |
| 2006/0238503 A1 | 10/2006 | Smith |
| 2006/0242062 A1 | 10/2006 | Peterson |
| 2006/0242063 A1 | 10/2006 | Peterson |
| 2006/0248009 A1 | 11/2006 | Hicks et al. |
| 2006/0249567 A1 | 11/2006 | Byrne |
| 2006/0273165 A1 | 12/2006 | Swift et al. |
| 2006/0274164 A1 | 12/2006 | Kimura et al. |
| 2006/0279628 A1 | 12/2006 | Fleming |
| 2006/0282383 A1 | 12/2006 | Doran |
| 2006/0289630 A1 | 12/2006 | Updike et al. |
| 2006/0291744 A1 | 12/2006 | Ikeda et al. |
| 2007/0002157 A1 | 1/2007 | Shintani et al. |
| 2007/0013721 A1 | 1/2007 | Vau et al. |
| 2007/0016796 A1 | 1/2007 | Singhal |
| 2007/0019243 A1 | 1/2007 | Sato |
| 2007/0022053 A1 | 1/2007 | Waserstein |
| 2007/0027802 A1 | 2/2007 | Vandeburg et al. |
| 2007/0030357 A1 | 2/2007 | Levien et al. |
| 2007/0031022 A1 | 2/2007 | Frew |
| 2007/0038561 A1 | 2/2007 | Vancini et al. |
| 2007/0041629 A1 | 2/2007 | Prakash et al. |
| 2007/0050292 A1 | 3/2007 | Yarbrough |
| 2007/0053574 A1 | 3/2007 | Verma et al. |
| 2007/0058851 A1 | 3/2007 | Quine |
| 2007/0063016 A1 | 3/2007 | Myatt |
| 2007/0064991 A1 | 3/2007 | Douglas et al. |
| 2007/0065143 A1 | 3/2007 | Didow et al. |
| 2007/0075772 A1 | 4/2007 | Kokubo |
| 2007/0076940 A1 | 4/2007 | Goodall et al. |
| 2007/0076941 A1 | 4/2007 | Carreon et al. |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1 | 4/2007 | Foth |
| 2007/0086643 A1 | 4/2007 | Spier |
| 2007/0094088 A1 | 4/2007 | Mastie |
| 2007/0094140 A1 | 4/2007 | Riney et al. |
| 2007/0100748 A1 | 5/2007 | Dheer |
| 2007/0110277 A1 | 5/2007 | Hayduchok et al. |
| 2007/0118472 A1 | 5/2007 | Allen-Rouman et al. |
| 2007/0122024 A1 | 5/2007 | Haas et al. |
| 2007/0124241 A1 | 5/2007 | Newton |
| 2007/0127805 A1 | 6/2007 | Foth et al. |
| 2007/0129955 A1 | 6/2007 | Dalmia |
| 2007/0131758 A1 | 6/2007 | Mejias et al. |
| 2007/0136198 A1 | 6/2007 | Foth et al. |
| 2007/0138255 A1 | 6/2007 | Carreon et al. |
| 2007/0140545 A1 | 6/2007 | Rossignoli |
| 2007/0140594 A1 | 6/2007 | Franklin |
| 2007/0143208 A1 | 6/2007 | Varga |
| 2007/0150337 A1 | 6/2007 | Hawkins et al. |
| 2007/0154098 A1 | 7/2007 | Geva et al. |
| 2007/0156438 A1* | 7/2007 | Popadic et al. ............... 705/1 |
| 2007/0168265 A1 | 7/2007 | Rosenberger |
| 2007/0168283 A1 | 7/2007 | Alvarez et al. |
| 2007/0171288 A1 | 7/2007 | Inoue |
| 2007/0172107 A1 | 7/2007 | Jones et al. |
| 2007/0172148 A1 | 7/2007 | Hawley |
| 2007/0175977 A1 | 8/2007 | Bauer et al. |
| 2007/0179883 A1 | 8/2007 | Questembert |
| 2007/0183000 A1 | 8/2007 | Eisen et al. |
| 2007/0183741 A1 | 8/2007 | Lerman et al. |
| 2007/0194102 A1 | 8/2007 | Cohen |
| 2007/0198432 A1 | 8/2007 | Pitroda et al. |
| 2007/0203708 A1 | 8/2007 | Polycn et al. |
| 2007/0206877 A1 | 9/2007 | Wu et al. |
| 2007/0208816 A1 | 9/2007 | Baldwin et al. |
| 2007/0214086 A1 | 9/2007 | Homoki |
| 2007/0217669 A1 | 9/2007 | Swift et al. |
| 2007/0233525 A1 | 10/2007 | Boyle |
| 2007/0233585 A1 | 10/2007 | Ben Simon et al. |
| 2007/0235518 A1 | 10/2007 | Mueller et al. |
| 2007/0235520 A1 | 10/2007 | Smith et al. |
| 2007/0241179 A1 | 10/2007 | Davis |
| 2007/0244782 A1 | 10/2007 | Chimento |
| 2007/0246525 A1 | 10/2007 | Smith et al. |
| 2007/0251992 A1 | 11/2007 | Sharma et al. |
| 2007/0255652 A1 | 11/2007 | Tumminaro |
| 2007/0255653 A1 | 11/2007 | Tumminaro |
| 2007/0255662 A1 | 11/2007 | Tumminaro |
| 2007/0258634 A1 | 11/2007 | Simonoff |
| 2007/0262137 A1 | 11/2007 | Brown |
| 2007/0262148 A1 | 11/2007 | Yoon |
| 2007/0268540 A1 | 11/2007 | Gaspardo et al. |
| 2007/0271182 A1 | 11/2007 | Prakash et al. |
| 2007/0278286 A1 | 12/2007 | Crowell et al. |
| 2007/0288380 A1 | 12/2007 | Starrs |
| 2007/0288382 A1 | 12/2007 | Narayanan et al. |
| 2007/0295803 A1 | 12/2007 | Levine |
| 2007/0299928 A1 | 12/2007 | Kohli et al. |
| 2008/0002911 A1 | 1/2008 | Eisen |
| 2008/0010204 A1 | 1/2008 | Rackley, III et al. |
| 2008/0021802 A1 | 1/2008 | Pendleton |
| 2008/0040280 A1 | 2/2008 | Davis |
| 2008/0046362 A1 | 2/2008 | Easterly |
| 2008/0052182 A1 | 2/2008 | Marshall |
| 2008/0059376 A1 | 3/2008 | Davis |
| 2008/0063253 A1 | 3/2008 | Wood |
| 2008/0065524 A1 | 3/2008 | Matthews et al. |
| 2008/0068674 A1 | 3/2008 | McIntyre |
| 2008/0071679 A1 | 3/2008 | Foley |
| 2008/0071721 A1 | 3/2008 | Wang |
| 2008/0073423 A1 | 3/2008 | Heit et al. |
| 2008/0080760 A1 | 4/2008 | Ronca |
| 2008/0086420 A1* | 4/2008 | Gilder et al. ............... 705/44 |
| 2008/0086421 A1 | 4/2008 | Gilder |
| 2008/0086770 A1 | 4/2008 | Kulkarni et al. |
| 2008/0091599 A1 | 4/2008 | Foss, Jr. |
| 2008/0097899 A1 | 4/2008 | Jackson et al. |
| 2008/0097907 A1 | 4/2008 | Till et al. |
| 2008/0103790 A1 | 5/2008 | Abernethy |
| 2008/0103967 A1 | 5/2008 | Ackert et al. |
| 2008/0113674 A1 | 5/2008 | Baig |
| 2008/0114739 A1 | 5/2008 | Hayes |

(56) References Cited

U.S. PATENT DOCUMENTS

| | | |
|---|---|---|
| 2008/0115066 A1 | 5/2008 | Pavley et al. |
| 2008/0116257 A1 | 5/2008 | Fickling |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0140579 A1 | 6/2008 | Sanjiv |
| 2008/0147549 A1 | 6/2008 | Rathbun |
| 2008/0155672 A1 | 6/2008 | Sharma |
| 2008/0156438 A1 | 7/2008 | Stumphauzer |
| 2008/0162319 A1 | 7/2008 | Breeden et al. |
| 2008/0162350 A1 | 7/2008 | Allen-Rouman et al. |
| 2008/0162371 A1 | 7/2008 | Rampell et al. |
| 2008/0177659 A1 | 7/2008 | Lacey et al. |
| 2008/0180750 A1 | 7/2008 | Feldman |
| 2008/0205751 A1 | 8/2008 | Mischler |
| 2008/0208727 A1 | 8/2008 | McLaughlin et al. |
| 2008/0214180 A1 | 9/2008 | Cunningham et al. |
| 2008/0219543 A1 | 9/2008 | Csulits |
| 2008/0245869 A1 * | 10/2008 | Berkun et al. ............ 235/462.1 |
| 2008/0247629 A1 | 10/2008 | Gilder |
| 2008/0247655 A1 | 10/2008 | Yano |
| 2008/0249931 A1 | 10/2008 | Gilder |
| 2008/0249951 A1 | 10/2008 | Gilder et al. |
| 2008/0262950 A1 | 10/2008 | Christensen et al. |
| 2008/0262953 A1 | 10/2008 | Anderson |
| 2008/0275821 A1 | 11/2008 | Bishop et al. |
| 2008/0301441 A1 | 12/2008 | Caiman et al. |
| 2008/0304769 A1 | 12/2008 | Hollander et al. |
| 2008/0316542 A1 | 12/2008 | Mindrum et al. |
| 2009/0024520 A1 | 1/2009 | Drory et al. |
| 2009/0046938 A1 | 2/2009 | Yoder |
| 2009/0060396 A1 | 3/2009 | Blessan et al. |
| 2009/0066987 A1 | 3/2009 | Lnokuchi |
| 2009/0076921 A1 | 3/2009 | Nelson et al. |
| 2009/0094148 A1 | 4/2009 | Gilder et al. |
| 2009/0108080 A1 | 4/2009 | Meyer |
| 2009/0110281 A1 | 4/2009 | Hirabayashi |
| 2009/0114716 A1 | 5/2009 | Ramachandran |
| 2009/0141962 A1 | 6/2009 | Borgia |
| 2009/0164350 A1 | 6/2009 | Sorbe et al. |
| 2009/0164370 A1 | 6/2009 | Sorbe et al. |
| 2009/0166406 A1 | 7/2009 | Pigg et al. |
| 2009/0167870 A1 | 7/2009 | Caleca et al. |
| 2009/0171795 A1 | 7/2009 | Clouthier et al. |
| 2009/0171819 A1 | 7/2009 | Martin |
| 2009/0171825 A1 | 7/2009 | Roman |
| 2009/0173781 A1 | 7/2009 | Ramachandran |
| 2009/0185241 A1 | 7/2009 | Nepomniachtchi |
| 2009/0185737 A1 | 7/2009 | Nepomniachtchi |
| 2009/0185738 A1 | 7/2009 | Nepomniachtchi |
| 2009/0190823 A1 | 7/2009 | Walters |
| 2009/0192938 A1 | 7/2009 | Amos |
| 2009/0212929 A1 | 8/2009 | Drory et al. |
| 2009/0236413 A1 | 9/2009 | Mueller et al. |
| 2009/0240620 A1 | 9/2009 | Kendrick et al. |
| 2009/0252437 A1 | 10/2009 | Li |
| 2009/0254447 A1 | 10/2009 | Blades |
| 2009/0257641 A1 | 10/2009 | Liu et al. |
| 2009/0263019 A1 | 10/2009 | Tzadok et al. |
| 2009/0271287 A1 | 10/2009 | Halpern |
| 2009/0281904 A1 | 11/2009 | Pharris |
| 2009/0284637 A1 | 11/2009 | Parulski et al. |
| 2009/0290751 A1 | 11/2009 | Ferman et al. |
| 2009/0292628 A1 | 11/2009 | Dryer et al. |
| 2009/0313167 A1 | 12/2009 | Dujari |
| 2009/0319425 A1 | 12/2009 | Tumminaro et al. |
| 2009/0327129 A1 | 12/2009 | Collas et al. |
| 2010/0007899 A1 | 1/2010 | Lay |
| 2010/0027679 A1 | 2/2010 | Sunahara et al. |
| 2010/0030687 A1 | 2/2010 | Panthaki et al. |
| 2010/0047000 A1 | 2/2010 | Park et al. |
| 2010/0057578 A1 | 3/2010 | Blair et al. |
| 2010/0061446 A1 | 3/2010 | Hands et al. |
| 2010/0078471 A1 | 4/2010 | Lin et al. |
| 2010/0082468 A1 | 4/2010 | Low et al. |
| 2010/0082470 A1 | 4/2010 | Walach |
| 2010/0165015 A1 | 7/2010 | Barkley et al. |
| 2010/0198733 A1 | 8/2010 | Gantman et al. |
| 2010/0225773 A1 | 9/2010 | Lee |
| 2010/0226559 A1 | 9/2010 | Najari et al. |
| 2010/0260408 A1 | 10/2010 | Prakash et al. |
| 2010/0262522 A1 | 10/2010 | Anderson et al. |
| 2010/0274693 A1 | 10/2010 | Bause et al. |
| 2010/0312705 A1 | 12/2010 | Caruso et al. |
| 2011/0016084 A1 | 1/2011 | Mundy et al. |
| 2011/0069180 A1 | 3/2011 | Nijemcevic et al. |
| 2011/0106675 A1 | 5/2011 | Perlman |
| 2011/0112967 A1 | 5/2011 | Anderson et al. |
| 2011/0170740 A1 | 7/2011 | Coleman |
| 2011/0191161 A1 | 8/2011 | Dai |
| 2011/0251956 A1 | 10/2011 | Cantley et al. |
| 2011/0280450 A1 | 11/2011 | Nepomniachtchi et al. |
| 2011/0285874 A1 | 11/2011 | Showering et al. |
| 2011/0310442 A1 | 12/2011 | Popadic et al. |
| 2012/0045112 A1 | 2/2012 | Lundblad et al. |
| 2012/0047070 A1 | 2/2012 | Pharris |
| 2012/0062732 A1 | 3/2012 | Marman et al. |
| 2012/0089514 A1 | 4/2012 | Kraemling et al. |
| 2012/0099792 A1 | 4/2012 | Chevion et al. |
| 2012/0185383 A1 | 7/2012 | Atsmon |
| 2012/0185388 A1 | 7/2012 | Pranger |
| 2012/0229872 A1 | 9/2012 | Dolev |
| 2013/0021651 A9 | 1/2013 | Popadic et al. |
| 2013/0120595 A1 | 5/2013 | Roach et al. |
| 2013/0198071 A1 | 8/2013 | Jurss |
| 2013/0223721 A1 | 8/2013 | Nepomniachtchi et al. |
| 2013/0297353 A1 | 11/2013 | Strange |
| 2014/0032406 A1 | 1/2014 | Roach et al. |
| 2014/0067661 A1 | 3/2014 | Elischer |
| 2014/0236820 A1 | 8/2014 | Carlton et al. |
| 2014/0279453 A1 | 9/2014 | Belchee et al. |
| 2015/0039528 A1 | 2/2015 | Minogue et al. |
| 2015/0090782 A1 | 4/2015 | Dent |

FOREIGN PATENT DOCUMENTS

| | | |
|---|---|---|
| KR | 20040076131 A | 8/2004 |
| WO | WO 98/37655 A1 | 8/1998 |
| WO | WO 01/61436 A2 | 8/2001 |
| WO | WO 2006/075967 A1 | 7/2006 |
| WO | WO 2006/086768 A2 | 8/2006 |
| WO | WO 2006/136958 A2 | 12/2006 |

OTHER PUBLICATIONS

"ImageNet Mobile Deposit Provides Convenient Check Deposit and Bill Pay to Mobile Consumers", Miteksystems, 2008, 2 pgs.

Non-Final Office Action of U.S. Appl. No. 12/195,745.

Non-Final Office Action of U.S. Appl. No. 12/195,732.

Rao, Bharat; "The Internet and the Revolution in Distribution: A Cross-Industry Examination"; Technology in Society; 1999; pp. 287-306; vol. 21, No. 3 (20 pgs).

Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).

Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).

DeYoung, Robert; "The Financial Performance of Pure Play Internet Banks"; Federal Reserve Bank of Chicago Economic Perspectives; 2001; pp. 60-75; vol. 25, No. 1 (16pgs).

Archive Index Systems; Panini My Vision X-30 or VX30 or X30 © 1994-2008 Archive Systems, Inc. P./O. Box 40135 Bellevue, WA USA 98015 (2 pgs).

Office Action issued in U.S. Appl. No. 12/195,732 dated Jun. 24, 2009.

Office Action issued in U.S. Appl. No. 12/195,732 dated Dec. 16, 2009.

(56) References Cited

OTHER PUBLICATIONS

Office Action issued in U.S. Appl. No. 12/195,732 dated Jun. 24, 2010.
Office Action issued in U.S. Appl. No. 12/195,732 dated Sep. 7, 2011.
Office Action issued in U.S. Appl. No. 12/195,745 dated Oct. 2, 2009.
Office Action issued in U.S. Appl. No. 12/195,745 dated Jun. 21, 2010.
Office Action issued in U.S. Appl. No. 12/195,745 dated Sep. 8, 2011.
Office Action Issued in U.S. Appl. No. 12/195,732 dated Dec. 30, 2008.
White, J.M. et al, "ImageThreshoulding for Optical Character Recognition and Other Applications Requiring Character Image Extraction", IBM J. Res. Develop, 1983, vol. 27.
Ritzer, J.R. "Hinky Dinky helped spearhead POS, remote banking movement", Bank System & Equipment, vol. 21, No. 12 pp. 51-54, Dec. 1984.
Dinan, R.F. Dinan et al., "ImagePlus High Performance Transaction System", IBM Systems Journal; 1990, pp. 431-434; vol. 29, No. 3.
Gupta, Amar et al., "An Integrated Architecture for Recognition of Totally Unconstrained Handwritten Numerals"; International Journal of Pattern Recognition and Artificial Intelligence; 1993, pp. 757-773; vol. 7, No. 4.
Masonson, L. "Check truncation and ACH trends—automated clearing houses," healthcare financial management association, http://WWN.findarticles.com/p/articles/mLm3276/is_n7_v47/ai_14466034/print, 1993.
Zhang, C.Y., "Robust Estimation and Image Combining," Astronomical Data Analysis Software and Systems IV, ASP Conference Series, 1995.
Kornai Andras et al., "Recognition of Cursive Writing on Personal Checks," Proceedings of International Workshop on the Frontiers in Handwriting Recognition, Sep. 1996, pp. 1-6.
De Queiroz, Ricardo et al., "Mixed RasterContent (MRC) Model for Compound Image Compression", pp. 1-12.
Rivlin, Alice M. et al., Chair, Vice Chair—Board of Governors, Committee on the Federal Reserve in the Payments Mechanism— Federal Reserve System, "The Federal Reserve in the Payments Mechanism", Jan. 1998.
J.D. Tygar, Atomicity in Electronic Commerce, Apr./May 1998 (Atomicity).
Anderson, Milton M. "FSML and Echeck", Financial Services Technology Consortium, 1999.
"Full Service Direct Deposit," www.nonprofitstaffing.com/images/upload/dirdepform.pdf, 2001.
Craig, Ben; "Resisting Electronic Payment Systems: Burning Down the House?", Federal Reserve Bank of Cleveland, Jul. 1999.
Rose, Sarah et al., "Best of the Web": The Top 50 Financial Websites. Money, New York Dec. 1999, vol. 28, iss12; pp. 178-187.
Furst, Karen et ai., "Internet Banking: Developments and Prospects", Office of the Comptroller of the Currency—Economic and Policy Analysis Working Paper Sep. 2000,Sep. 2000.
Middleware, URL: http://www.cs.umanitoba.ca/maheswar/anc2oo2/PAPERS/bako1.pdf, Jun. 24, 2008.
Palacios, Rafael et al., "Automatic Processing of Brazilian Bank Checks", Machine Vision and Applications; 2002, pp. 1-28.
Peter, J. Wallison, "Wal-Mart Case Exposes Flaws in Banking-Commerce Split", American Banker, vol. 167. No. 8, Jan. 17, 2002.
Heckenberg, D., "Using Mac OSX for Real-Time Image Processing," 2003.
Burnett, J., "Depository Bank Endorsement Requirements," Bankersonline.com, http://www.bankersonline.com/cgi-ban/printview.pl, 2003.
Blafore, Bonnie, "Lower Commissions, Fewer Amenities." Better Investing. Madison Heights: Feb. 2003, vol. 52, iss 6; pp. 50-51.
"Direct Deposit Authorization Form" www.umass.edu/humres/library/DDForm.pdf, 2003.
Electronic Billing Problem: The E-check is in the mail-American Banker-v168, n 95, 91, May 2003.
Oxley, Michael G., from committee on Financial Services; "Check Clearing for the 21 st Century Act", 108th Congress—1st session, House of Representatives, report 108-132, Jun. 2, 2003, pp. 1-20.
Shelby, Hon. Richard C. (Chairman, Committee on Baking, Housing and Urban Affairs); "Check Truncation Act of 2003", calendar No. 168, 108th Congress, 1st Session Senate report 108-79, Jun. 25, 2003.
Knestout, Brian P. et al., "Banking Made Easy" Kiplinger's Personal Fiance, Washington :Jul. 2003, vol. 57 iss 7; pp. 44-47.
Oxley, Michael G, from the committee of conference; "Check Clearing for the 21st Century Act", 108th Congress—1st Sessi9n, House of Representatives, Report 108-291 , Oct. 1, 2003, pp. 1-27.
Public Law 108-100-108th Congress; "An Act-Check Clearing for the 21 st Century Act". Oct. 28, 2003, [H. R. 1474], 117 STAT. 1177, 12 USC 5001.
Johnson, ,Jennifer J., Secretary of Board; Federal Reserve System, 12 CFR Part 229, Regulation CC; "Availability of Funds and Collection of Checks", 2009, pp. 1-89.
Mohl, Bruce, "Banks Reimbursing ATM Fee to Compete With Larger Rivals." Boston Globe, Boston, MA., Sep. 2004, pp. 1E.
The Automated Clearinghouse, "Retail Payment Systems; Payment Instruments, Clearing and Settlement; The Automated Clearinghouse (ACH)," www.ffiec.gov/ffiecinfobase/booklets/retailretail_o2d.html, Dec. 2005.
"Two Words Every Business Should Know: Remote Deposit," Canon, http://www.rpsolutions.com/rpweb/pdfs/ canon_rdc.pdf, 2005.
Wells Fargo 2005 News Releases, "The New Wells Fargo Electronic Deposit Services Break Through Banking Boundaries in the Age of Check 21", San Francisco Mar. 28, 2005, wwwwellsfargo.com/press/3282005_check21?year=2005.
Constanzo, Chris "Remote Check Deposit: Wells Captures a New Checking Twist", Bank Technology News Article—May 2005. www.americanbanker.com/btn_article.html?id=20050502YQ50FSG>.
Integrated Data, Message, and Process Recovery for Failure Masking in Web Services, Dissertation zur Erlangung des Grades des Doktors der Ingenieurwissenschaften der Naturwissenschaftlich-Technischen Fakultat I der Universitat des Saari andes, Saarbrucken, im Jul. 2005.
Credit Union Journal, "AFCU Averaging 80 DepositHome Transactions Per Day", Credit Union Journal, Aug. 15, 2005.
Federal Check 21 Act, "New Check 21 Act effective Oct. 28, 2004: Bank No Longer Will Return Original Cancelled Checks," Consumer Union's FAQ's and Congressional Testimony on check 21, www.consumerlaw.orglinitiativeslcontentlcheck21—content.html.
BankServ, "depositNow: What's the difference?", 2006, DepositNow. http://www.bankserv.com/products/remoteddeposithtm, 2006, Bankserv.
Blue Mountain Consulting, from URL: www.bluemountainconsulting.com. Apr. 26, 2006.
Remotedepositcapture, URL: www.remotedepositcapture.com, 2006.
Onlinecheck.com/Merchant Advisors, "real-Time Check Debit", Merchant Advisors: Retail Check Processing Check Conversion, http://www.onlinecheck/wach/rcareal.htm, 2006.
"Compliance with Regulation CC," http://www/federalreserve.org/Pubsregccregcc.htm, Jan. 24, 2006, 6 pgs.
Chiang, Chuck Chiang, The Bulletin, "Remote banking offered", Feb. 1, 2006, http://bendbulietin.com/apps/pbcs.dll/article? AI D=/20060201/BIZ0102/60201 0327&tempi. . . .
Federal Reserve Board, "Check Clearing for the 21st Century Act," FRB, http://www.federalreserve.gov/paymentsystems/turncation/, 2006.
Fest, G., "Patently Unaware," Bank Technology News, 412006, Retrieved from the internet at URL: http://banktechnews.com/article.html?id=20060403T7612618.
Bank Systems & Technology, Untitled Article, 5/112006, http://www.banktech.com/showarticle.jhtml? articleID=187003126>, pp. 1-4, Copyright 2004-2005 CMP Media, LLC.
Digital Transactions News, "An ACH-Image Proposal for Check Roils Banks and Networks", May 26, 2006.
BankServ Press release, "BankServ Announces New Remote Deposit Product Integrated With QuickBooks", San Francisco, Jul. 6, 2006, Remotedepositcapture.com, pp. 1-3.

(56) References Cited

OTHER PUBLICATIONS

Remote Deposit Capture News Article, "PNC Bank to Offer Ease of Online Deposit Service Integrated with QuickBooks to Small Businesses", Remote Deposit Capture News Articles from 7/2412006, remotedepositcapture.com, pp. 1-2.
Dias, Danilo et al., "A Model for the Electronic Representation of Bank Checks", Universidade de Brasilia.
"Check Fraud: A Guide to Avoiding Losses," All Net, http://all.netlbooks/auditlcheckfraud/security.htm, 2007.
"What is check Fraud," National Check Fraud Center, http://www.ckfraud.org/ckfraud.html, 2007.
"Remote Deposit," National City, http://www.nationalcity.com/smallbusiness/cashmanagementlremotedepositldefault.asp, 2007.
"Remote Deposit Capture," Plante & Moran, http://plantemoran.comlindustries/financialinstitutions/banklresourceslcommunity+bank+advisor/2007+summer+issue/remote+deposit+capture.htm, 2007.
"Virtual Bank Checks," Morebusiness.com, http://www.morebusiness.com/running_your_business/businessbitsld908484987.brc, 2007.
Canon, "ImageFormula CR-25, Improve Your Bottom Line With Front-Line Efficiencies", 0117W117, 1207-55/25-1 OM-BSP, 2007.
"It's the easiest way to switch banks," LNB, http://www.inbky.com/pdf/LNBswitch-kit10-07.pdf, 2007.
"Lesson 38—More Bank Transactions," Turtle Soft, http://www,turtlesoft.com/goldenseal-software-manual/lesson38. htm, 2007.
"Personal Finance," PNC, http://www.pnc.comlwebapp/unsec/productsandservice.do?sitearea=/PNC/home/personall account+services/quick+switch/quick+switch+faqs, 2007.
"Switching Made Easy," Bank of North Georgia, http://www.banknorthgeorgia.com/cmsmaster/documents/286/documents616.pdf, 2007.
"Chapter 7 Payroll Programs," Uniform staff Payroll System, http://www2.oecn.k12.oh.us/www/ssd1/usps/usps_user_guide_005.html, 2007.
"Check 21 Solutions," Columbia Financial International, Inc. http://www.columbiafinanical.us/check21-solutions.htm, 2007.
"Direct Deposit", University of Washington, http://www.washington.edu/admin/payroll/directdeposit.html, 2007.
"Accept "Customer Not Present" Checks," Accept Check Online, http://checksoftware.com/, 2007.
"Customer Personalized Bank Checks and Address Labels" Checks Your Way, Inc., http://www.checksyourway.com/htm/web_pages/faq.htm, 2007.
"Direct Deposit Application for Payroll," Purdue, http://purdue.edu/payroll/pdf/directdepositapplication.pdf, 2007.
"Frequently Asked Questions," Bank of America, http://www.bankofamerica,com/deposits/checksave/index.cfm?template=1c_faq_bymail, 2007.
"Refractive index" wikipedia, the free encyclopedia; http://en.wikipedia.org/wiki/refractivejndex.
Patterson, Scott, "USAA Deposit@Home—Another WOW moment for Net Banking", NextCU.com, 2007.
Remotedepositcapture.com, LLC, "Remote Deposit Capture Overview," ROC Overview, http://remotedepositcapture.com/overview/RDC_overview.htm, Mar. 12, 2007.
Board of Governors of the federal reserve System, "Report to Congress on the Check Clearing for the 21 st Century Act of 2003" Apr. 2007, Submitted to the Congress pursuant to section 16 of the Check Clearing for the 21 st Century Act of 2003.
Image Master, "Photo Restoration: We specialize in digital photo restration and photograp repair of family pictures", http://www.imphotorepair.com, downloaded Apr. 2007.
"Save on ATM Fees", Chicago Tribune, Chicago, IL., Jul. 2007.
Association of German Banks, SEPA 2008: Uniform Payment Instruments for Europe, Berlin, Jul. 2007, Bundesverband deutscher banker eV.
Creativepaymentsolutions.com, "Creative Payment Solutions—Websolution", www.creativepaymentsolution.com/cps/financiaLservices/websolution/default.html, copyright 2008, Creative Payment Solutions, Inc.

"How to Digitally Deposit a Check Image", Smart Money Daily, downloaded 2008.
DCU Member'S Monthly—Jan. 2008, "PC Deposit—Deposit Checks from Home!", http://www.mycreditunionnewsletter.com/dcu/01 08/pagel.html, pp. 1-2, copyright 2008 Digital Federal Credit Union.
"PC Deposit: Deposit Checks From Home!", Digital federal Credit Union, 2008.
Mitek Systems: Mitek Systems Launches First Mobile Check Deposit and Bill Pay Application, Jan. 22, 2008, San Diego, CA.
Windowsfordevices.com, "Software lets camera phone users deposit checks, pay bills", Jan. 29, 2008, www.windowsfordevices.com/news/NS3934956670.html.
Bruene, Jim; "Check Free to Enable In-Home Remote Check Deposit for Consumers and Small Business", NetBanker. com, Feb. 5, 2008, http://www.netbanker.com/2008/02/checkfree_to_enable_inhome_rem.html, 1995-2007, Financial Insite, Inc.
CNN.comltechnology, "Scan, deposit checks from home", Feb. 7, 2008, www.cnn.com/2008ITECH/biztech/02/07/check. scanning.ap/index.html.
"WallStreetGrapevine.com" stocks on the rise: JADG, BKYI, MITK; M2 presswire, Coventry: Mar. 3, 2008.
The Green Sheet 2.0: Newswire, "CO-OP adds home deposit capabilities to suite of check imaging products", www.greensheet.com/newswire.php?newswire_id=8799., 2009, pp. 1-2.
Matthews, Deborah, "Advanced Technology Makes Remote Deposit Capture Less Risky", Indiana Bankers Association, Apr. 2008.
Bruene, Jim; "Digital Federal Credit Union and Four Others Offer Consumer Remote Deposit Capture Through EasCorp", NetBanker—Tracking Online Finance, Apr. 13, 2008, www.netbanker.com/2008/04/digitaUederal_credit_union_a.html, 1995-2007, FinanciaIlnsite, Inc.
Credit Union Journal, "The Ramifications of Remote Deposit Capture Success", Credit Union Journal—Apr. 14, 2008, www.cujournaL.com/printthis.html?id=20080411 EODZT57G.
Wells Fargo Commercial, "Remote Deposit", www.wellsfargo.com/com/treasury_mgmtlreceivables/ electronic/remote_deposit, 1999-2008, Wells Fargo.
"Adjusting Brightness and Contrast", www.eaglesoftware.com.
Mitek systems, Imagenet Mobile Deposit, San Diego, CA. 2 Pages.
Fisher, Dan M "Home Banking in the 21st century: Remote Capture Has Gone Retail", 4 pages.
Affinity Federal Credit Union, "Affinity announces online deposit," Aug. 4, 2005, Affinity Federal Credit Union.
"Check 21—The check is not in the post", RedTitan Technology 2004./http://www.redtitan.com/check21/htm, 3 pgs[7].
Hartly, Thomas, "Banks Check Out New Image", Business First, Buffalo: Jul. 16, 2004, vol. 20, Iss 43, p. 1 , 3 pages[7].
Wade, Will, "Early Notes: Updating Consumers on Check 21" American Banker Aug. 10, 2004. (3 pages)[7].
Application as filed Jun. 25, 2007 for U.S. Appl. No. 11/861,164 (39 pgs).
"Best practices for producing quality digital image files," Digital Images Guidelines, http://deepblue.lib.umich.edu/bitstream/2027.42/40247/1/Images-Best_Practice.pdf, downloaded 2007 (2 pgs).
"Clearing House Electronic Check Clearing System (CHECCS) Operating Rules," an IP.com Prior Art Database Technical Disclosure, Jul. 29, 2015 (35 pgs).
"Deposit Now: Quick Start User Guide," BankServ, 2007, 2 pages.
"First Wireless Handheld Check and Credit Card Processing Solution Launched by Commericant®, MobileScape® 5000 Eliminates Bounced Checks, Enables Payments Everywhere," Business Wire, Mar. 13, 2016, 3 pages.
"Mitek Systems Announces Mobile Deposit Application for Apple iPhone," http://prnewswire.com/cgi-bin/stories/pl?ACCT=104 &STORY=/www/story/10-01-. . ., Nov. 25, 2008 (2 pgs).
"NOVA Enhances Electronic Check Service to Benefit Multi-Lane Retailers," Business Wire, Nov. 28, 2006, 2 pages.
"Remote check deposit is the answer to a company's banking problem," Daily Breeze, Torrance, CA, Nov. 17, 2006, 2 pgs.
"SNB Check Capture: SmartClient User's Guide," Nov. 2006, 21 pgs.
"WallStreetGrapevine.com" Stocks on the Rise: JADG, BKYI, MITK; Mar. 3, 2008 (4 pgs).

(56) References Cited

OTHER PUBLICATIONS

"Exchangeable image file format for digital still cameras: Exif Version 2.2," Standard of Electronics and Information Technology Industries Associate, JEITA CP-3451, Technical Standardization Committee on AV & IT Storage Systems and Equipments, Japan Electronics and Information Technology Industries Association, Apr. 2002 (154 pgs). (retrieved from: http://www.exif.org/Exif2-2.PDF).
Albrecht, W. Steve, "Check Kiting: Detection, Prosecution and Prevention," The FBI Law Enforcement Bulletin, Nov. 1, 1993 (6 pgs).
Amber Avalona-Butler / Paraglide, "At Your Service: Best iPhone Apps for Military Lifestyle," Jul. 9, 2010 (2 pgs).
Aradhye, Hrishikesh B., "A Generic Method for Determining Up/Down Orientation of Text in Roman and Non-Roman Scripts," Pattern Recognition Society, Dec. 13, 2014, 18 pages.
Automated Merchant Systems, Inc., "Electronic Check Conversion," http://www.automatedmerchant.com/electronic_check_conversion.cfm, 2006, downloaded Oct. 18, 2006 (3 pgs).
Bills, Steve, "Automated Amount Scanning Is Trend in Remote-Deposit," American Banker, New York, NY, Aug. 30, 2005, (3 pgs).
BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).
Braun, Tim, "Camdesk—Towards Portable and Easy Document Capture," Image Understanding and Pattern Recognition Research Group, Department of Computer Science, University of Kaiserslautern, Technical Report, Mar. 29, 2005 (64 pgs). (Retrieved from: https://pdfs.semanticscholar.org/93b2/ea0d12f24c91f3c46fa1c0d58a76bb132bd2.pdf).
Bruno, M., "Instant Messaging," Bank Technology News, Dec. 2002 (3 pgs).
Carrubba, P. et al., "Remote Deposit Capture: A White Paper Addressing Regulatory, Operational and Risk Issues," NetDeposit Inc., 2006 (11 pgs).
Century Remote Deposit High-Speed Scanner User's Manual Release 2006, (Century Manual), Century Bank, 2006, (32 pgs).
Credit Union Management, "When You wish Upon an Imaging System . . .the Right Selection Process can be the Shining Star," Credit Union Management, Aug. 1993, printed from the internet at <http://search.proquest.com/docview/227756409/14138420743684F7722/15?accountid=14 . . .>, on Oct. 19, 2013 (11 pgs).
De Jesus, A. et al., "Distributed Check Processing in a Check 21 Environment: An educational overview of the opportunities and challenges associated with implementing distributed check imaging and processing solutions," Panini, 2004, pp. 1-22.
Debello, James et al., "RDM and Mitek Systems to Provide Mobile Check Deposit," Mitek Systems, Inc., San Diego, California and Waterloo, Ontario, (Feb. 24, 2009), 2 pgs.
Doermann, David et al., "Progress in Camera-Based Document Image Analysis," Proceedings of the Seventh International Conference on Document Analysis and Recognition (ICDAR 2003) 0-7695-1960-1/03, 2003 IEEE (11 pages).
Duvall, Mel, "Remote Deposit Capture," Baseline, vol. 1, Issue 70, Mar. 2007, 2 pgs.
eCU Technologies, "Upost Remote Deposit Solution," Retrieved from the internet https://www.eutechnologies.com/products/upost.html, downloaded 2009 (1 pg).
EFT Network Unveils FAXTellerPlus, EFT Network, Inc., www.eftnetwork.com, Jan. 13, 2009 (2 pgs).
ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).
Federal Reserve System, "12 CFR, Part 229 [Regulation CC; Docket No. R-0926]: Availability of Funds and Collection of Checks," Federal Registrar, Apr. 28, 1997, pp. 1-50.
Federal Reserve System, "Part IV, 12 CFR Part 229 [Regulation CC; Docket No. R-1176]: Availability of Funds and Collection of Checks; Final Rule," Federal Registrar, vol. 69, No. 149, Aug. 4, 2004, pp. 47290-47328.
Fidelity Information Services, "Strategic Vision Embraces Major Changes in Financial Services Solutions: Fidelity's long-term product strategy ushers in new era of application design and processing," Insight, 2004, pp. 1-14.
Garry, M., "Checking Options: Retailers face an evolving landscape for electronic check processing that will require them to choose among several scenarios," Supermarket News, vol. 53, No. 49, 2005 (3 pgs).
Gupta, Maya R. et al., "OCR binarization and image pre-processing for searching historical documents," Pattern Recognition, vol. 40, No. 2, Feb. 2007, pp. 389-397.
Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).
Herley, Cormac, "Efficient Inscribing of Noisy Rectangular Objects in Scanned Images," 2004 International Conference on Image Processing, 4 pages.
Hildebrand, C. et al., "Electronic Money," Oracle, http://www.oracle.com/oramag/profit/05-feb/p15financial.html, 2005, downloaded Oct. 18, 2006 (5 pgs).
Hillebrand, G., "Questions and Answers About the Check Clearing for the 21st Century Act, 'Check 21,'" ConsumersUnion.org, http://www.consumersunion.org/finance/ckclear1002.htm, Jul. 27, 2004, downloaded Oct. 18, 2006 (6 pgs).
lida, Jeanne, "The Back Office: Systems—Image Processing Rolls on as Banks ReapBenefits," American Banker, Jul. 19, 1993, printed from the internet at <http://search.proquest.com/docview/292903245/14138420743684F7722/14?accountid=14. . .>, on Oct. 19, 2013 (3 pgs).
Investment Systems Company, "Portfolio Accounting System," 2000, pp. 1-32.
JBC, "What is a MICR Line?," eHow.com, retrieved from http://www.ehow.com/about_4684793_what-micr-line.html on May 4, 2009 (2 pgs).
Kendrick, Kevin B., "Check Kiting, Float for Purposes of Profit," Bank Security & Fraud Prevention, vol. 1, No. 2, 1994 (3 pgs).
Lampert, Christoph et al., "Oblivious Document Capture and Real-Time Retrieval," International Workshop on Camera Based Document Analysis and Recognition (CBDAR), 2005 (8 pgs). (Retrieved from: http://www-cs.ccny.cuny.edu/~wolberg/capstone/bookwarp/LampertCBDAR05.pdf).
Levitin, Adam J., Remote Deposit Capture: A Legal and Transactional Overview, Banking Law Journal, p. 115, 2009 (RDC).
Liang, Jian et al., Camera-Based Analysis of Text and Documents: A Survey, International Journal on Document Analysis and Recognition, Jun. 21, 2005, 21 pages.
Luo, Xi-Peng et al., "Design and Implementation of a Card Reader Based on Build-In Camera," Proceedings of the 17th International Conference on Pattern Recognition, 2004, 4 pages.
Metro 1 Credit Union, "Remote Banking Services," hltp://ww\\i.metro1cu.org/metro1cu/remote.html, downloaded Apr. 17, 2007 (4 pgs).
Moreau, T., "Payment by Authenticated Facsimile Transmission: a Check Replacement Technology for Small and Medium Enterprises," Connotech Experts-conseils, Inc., Apr. 1995 (31 pgs).
Nelson, B. et al., "Remote deposit capture changes the retail landscape," Northwestern Financial Review, http://findarticles.com/p/articles/mi qa3799/is200607/ai_n16537250, 2006 (3 pgs).
NetBank, Inc., "Branch Out: Annual Report 2004," 2004 (150 pgs).
NetBank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nixon, Julie et al., "Fiserv Research Finds Banks are Interested in Offering Mobile Deposit Capture as an," Fiserv, Inc. Brookfield, Wis., (Business Wire), (Feb. 20, 2009), 2 pgs.
Online Deposit: Frequently Asked Questions, http://www.depositnow.com/faq.html, Copyright 2008 (1 pg).

(56) References Cited

OTHER PUBLICATIONS

Richey, J. C. et al., "EE 4530 Check Imaging," Nov. 18, 2008 (10 pgs).
SoyBank Anywhere, "Consumer Internet Banking Service Agreement," Dec. 6, 2004 (6 pgs).
Teixeira, D., "Comment: Time to Overhaul Deposit Processing Systems," American Banker, Dec. 10, 1998, vol. 163, No. 235, p. 15 (3 pgs).
Thailandguru.com: How and where to Pay Bills @ www.thailandguru.com/paying-bills.html, © 1999-2007 (2 pgs).
The Green Sheet 2.0: Newswire, "CO-OP adds home deposit capabilities to suite of check imaging products", www.greensheet.com/newswire.php?newswire_id=8799, Mar. 5, 2008 (2 pgs).
Valentine, Lisa, "Remote Deposit Capture Hot Just Got Hotter," ABA Banking Journal, Mar. 2006, p. 1-9.
Vaream, Craig, "Image Deposit Solutions: Emerging Solutions for More Efficient Check Processing," JP Morgan Chase, Nov. 2005 (16 pgs).
Wade, Will, "Early Debate on Remote-Capture Risk," American Banker, New York, NY, May 26, 2004 (3 pgs).
Whitney et al., "Reserve Banks to Adopt DSTU X9.37/2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pages).
Wikipedia ®, "Remote Deposit," http://en.wikipedia.org/wiki/Remote_deposit, 2007 (3 pgs).
Wolfe, Daniel, "Check Image Group Outlines Agenda," American Banker, New York, N.Y.: Feb 13, 2009, vol. 174, Iss. 30, p. 12. (2 pgs).
Woody Baird Associated Press, "Pastor's Wife got Scammed—She Apparently Fell for Overseas Money Scheme," The Commercial Appeal, Jul. 1, 2006, p. A. 1.
Zandifar, A., "A Video-Based Framework for the Analysis of Presentations/Posters," International Journal on Document Analysis and Recognition, Feb. 2, 2005, 10 pages.
Zions Bancorporation, "Moneytech, the technology of money in our world: Remote Deposit," http://www.bankjunior.com/pground/moneytech/remote_deposit.jsp, 2007 (2 pgs).
"Quicken Bill Pay", Retrieved from the Internet on Nov. 27, 2007 at: <URL:http://quicken intuit.com/quicken-bill-pay-jhtml>, 2 pgs.
"Start to Simplify with Check Imaging a Smarter Way to Bank", Retrieved from the Internet on Nov. 27, 2007, at: <URL: http://www.midnatbank.com/Internet%20Banking/internet_Banking.html>, 3 pgs.
12 CFR § 229.51 and Appendix D to Part 229 (1-1-05 edition), 4 pgs.
149 Cong. Rec. H9289, Oct. 8, 2003, 6 pgs.
Apple Announces the New iPhone 3GS—The Fastest, Most Powerful iPhone Yet, Jun. 8, 2009, located on the Internet at: http://www.apple.com.rensroom/2009/06/08Apple-Annpounces-the-New-iPhone-3GS-The Fastest-Most-Powerful-iPhone-Yet, 4 pgs.
Apple Reinvents the Phone with iPhone, Jan. 2007, located on the Internet at: https://www.apple.com/newsroom/2007/01/09Apple-Reinvents-the-Phone-with-iPhone/, 4 pgs.
Askey, Canon EOS 40D Review (pts.1,4,10), Digital Photography Review, located on the Internet at: : https://www.dpreview.com/reviews/canoneos40d, 24 pgs.
Askey, Leica Digilux 2 Review (pts.1,3,7), Digital Photography Review, May 20, 2004, located on the Internet at: : https://www.dpreview.com/reviews/leicadigilux2, 20 pgs.
Askey, Nikon D300 In-depth Review (pts.1,3,9), Digital Photography Review, Mar. 12, 2008, located on the Internet at: : https://www.preview.com/reviews/nikond300, 24 pgs.
Askey, Panasonic Lumix Dmc-L1 Review (pts.1,3,7), Digital Photography Review, Apr. 11, 2007, located on the Internet at: https://www.dpreview.com/reviews/panasonicdmc11, 24 pgs.
Askey, Sony Cyber-shot DSC-R1 Review (pts,1,3,7), Digital Photography Review, Dec. 6, 2005, located on the Internet at: http://www.dpreview.com.reviews/sonydscr1, 24 pgs.
Automated Clearing Houses (ACHs), Federal Reserve Bank of New York (May 2000) available at: https://www.newyorkfed.org/aboutthefed/fedpoint/fed31.html, (attached as Exhibit 12 from the Defendant Wells Fargo Bank, N.A.'s Answer dated Aug. 14, 2018), 4 pgs.
Berman, How Hitchcock Turned a Small Budget Into a Great Triumph, Time.com, Apr. 29, 2015, located on the Internet at: http://time.com/3823112/alfred-hitchcock-shadow-of-a-doubt, 1 pg.
Big Red Book, Adobe Systems Incorporated, copyright 2000, (attached as Exhibit 27 from the Defendant Wells Fargo Bank, N.A.'s Answer dated Aug. 14, 2018), 45 pgs.
Canon EOS 40D Digital Camera Instruction Manual, located on the Internet at: http://gd1p01.c-wss.com/gds/6/0900008236/01/E0S40D_HG_EN.pdf (attached as Exhibit 6 from the Defendant Wells Fargo Bank, n. A.'s Answer dated Aug. 14, 2018), 38 pgs.
Check Clearing for the 21st Century Act Foundation for Check 21 Compliance Training, Federal Financial Institutions Examination Council, (Oct. 16, 2004), available on the Internet at: https://web.archive.org/web/20041016100648/https://www.ffiec.gov/exam/check21/check 21foundationdoc.htm, (excerpts attached as Exhibit 20 from the Defendant Wells Fargo Bank, n. A.'s Answer dated Aug. 14, 2018), 11 pgs.
Chen, Brian et al., iPhone 3GS Trounces Predecessors, Rivals in Web Browser Speed Test, Wired, Jun. 24, 2009, located on the Internet at: www.wired.com/2009.3gs-speed/, 10 pgs.
Defendant Wells Fargo Bank, N.A.'s Answer, Affirmative Defenses, and Counterclaims to Plaintiff's Complaint, dated Aug. 14, 2018, 64 pgs.
Declaration of Peter Alexander, Ph.D., CBM2019-0004, Nov. 8, 2018, 180 pgs.
Excerpts from American National Standard for Financial Services, ANS, X9.100-140-2004-Specifications for an Image Replacement Document—IRD, Oct. 1, 2004, 16 pgs.
Gates, A History of Wireless Standards, Wi-Fi Back to Basics, Aerohive Blog, Jul. 2015, located on the Internet at: http://blog.aerohive.com/a-history-of-wireless-standards, 5 pgs.
Guidelines for Evaluation of Radio Transmission Technologies for Imt-2000, dated 1997, Itu-R-M.1225, located on the Internet at: https://www.itu.int/dmspubrec/itu-r/rec/m/R-REC-M,1225-0-199702-1!!PDF-E.pdf, 60 pgs.
Helio Ocean User Manual, located on the Internet at: https://standupwireless.com/wp-content/uploads/2017/04/Manual_PAN-TECH_OCEAN.pdf (excerpts attached as Exhibit 10 from the Defendant Wells Fargo Bank, N.A.'s Answer dated Aug. 14, 2018), 76 pgs.
HTC Touch Diamond Manual, copyright 2008, (attached as Exhibit 11 from the Defendant Wells Fargo Bank, N.A.'s Answer dated Aug. 14, 2018), 257 pgs.
Humphrey, David B. And Hunt, Robert, "Getting Rid of Paper: Savings From Check 21", Working Paper No. 12-12, Research Department, Federal Reserve Bank of Philadelphia, (May 2012), available on the Internet at: https://philadelphiafed.org/-/media/research-and-data/publications/working-papers/2012/wp12-12.pdf, (attached as Exhibit 14 from the Defendant Wells Fargo Bank, N.A.'s Answer dated Aug. 14, 2018), 29 pgs.
iPhone Store Downloads Top 10 Million in First Weekend, Jul. 14, 2008, located on the Internet at: iPhone Store Downloads Top 10 Million in First Weekend, Jul. 14, 2008, located on the Internet at: https://www.apple.com/newsroom/2008/07/14iPhone-App-Store-Downloads-Top-10-Million-in-First-Weekend/, 4pgs.
Joinson et al., Olympus E-30 Review (pts.1,4,8), Digital Photography Review, Mar. 24, 2009, located on the Internet at: www.dpreview.com/reviews/olympus30, 26 pgs.
Knerr et al., the A2iA Intercheque System: Courtesy Amount and Legal Amount Recognition for French Checks in Automated Bankcheck Processing 43-86, Impedove et al. eds., 1997, 50 pgs.
Lacker, Jeffrey M., "Payment System Disruptions and the Federal Reserve Following Sep. 11, 2001", the Federal Reserve Bank of Richmond, (Dec. 23, 2003) (attached as Exhibit 19 from the Defendant Wells Fargo Bank, n. A.'s Answer dated Aug. 14, 2018), 55 pgs.

(56) References Cited

OTHER PUBLICATIONS

Leica Digilux 2 Instructions located on the Internet: http://www.overgaard.dk/pdf/d2_manual.pdf (attached as Exhibit 2 from the Defendant Wells Fargo Bank n. A.'s Answer dated Aug. 14, 2018), 95 pgs.
"Machine Accepts Bank Deposits", New York Times, Apr. 12, 1961, 1 pg.
MacKenzie, E., Photography Made Easy, copyright 1845, 80 pgs.
Motorola Razr Marx V6 User Manual, located on the Internet at: https://www.phonearena.com/phones/Motorola-Razr-Maxx-V6_id1680, (attached as Exhibit 7 from the Defendant Wells Fargo Bank, n. A.'s Answer dated Aug. 14, 2018), 36 pgs.
Motmanual for Motorazr, located on the Internet at: https://www.cellphones.ca/downloads/phones/manuals/motorola-razr-v3xx-manual.pdf (excerpts attached as Exhibit 8 from the Defendant Wells Fargo Bank, n. A.'s Answer dated Aug. 14, 2018), 34 pgs.
Nikon Digital Camera D300 User's Manual, located on the Internet at: http://download.nikonimglib.com/archive2/iBuJv00Aj97i01y8BrK49XXOTs69/D300,Eu(En )04.pdf (attached as Exhibit 5 from the Defendant Wells Fargo Bank, n. A.'s Answer dated Aug. 14, 2018), 195 pgs.
Nokia N95 8GB User Guide, copyright 2009, located on the Internet at: https://www.nokia.com/en_int/phones/sites/default/files/user-guides/Nokia_N95_8GB_Extended_UG_en.pdf (excerpts attached as Exhibit 9 from the Defendant Wells Fargo Bank, n. A.'s Answer dated Aug. 14, 2018), 77 pgs.
Panasonic Operating Instructions for Digital Camera/Lens Kit Model No. Dmc-L1K, https://www.panasonic.com/content/dam/Panasonic/support_manual/Digital_Still_Camera/English_01-vqt0-vqt2/vqt0w95_L1_oi.pdf (attached as Exhibit 4 from the Defendant Wells Fargo Back N.A.'s Answer dated Aug. 14, 2018), 129 pgs.
POP, ARC and BOC—A Comparison, Federal Reserve Banks, at 1(Jan. 7, 2009), available on the Internet at: https://web.archive.org/web/20090107101808/https://www.frbservices.org/files/eventsed ucation/ pdf/pop_arc_boc_comparison.pdf (attached as Exhibit 13 from the Defendant Wells Fargo Bank, N.A.'s Answer dated Aug. 14, 2018), 3 pgs.
Quinn and Roberds, the Evolution of the Check as a Means of Payment: a Historical Survey, Federal Reserve Bank of Atlanta, Economic Review, 2008, 30 pgs.
Petition filed by Wells Fargo Bank, N.A. For Covered Business Method Review of Claims 1-20 of U.S. Pat. No. 9,818,090, dated Nov. 8, 2018, 90 pgs.
Petition filed by Wells Fargo Bank, N.A. For Covered Business Method Review of Claims 1-20 of U.S. Pat. No. 9,336,517, dated Nov. 8, 2018, 98 pgs.
Petition filed by Wells Fargo Bank, N.A. For Covered Business Method Review of Claims 1-20 of U.S. Pat. No. 8,977,571, dated Nov. 8, 2018, 95 pgs.
Petition filed by Wells Fargo Bank, N.A. For Covered Business Method Review of Claims 1-23 of U.S. Pat. No. 8,699,779, dated Nov. 8, 2018, 101 pgs.
Rockwell, the Megapixel Myth, KenRickwell.com, 2008, located on the Internet at: http://kewrockwell.com.tech/mpmyth.htm, 6 pgs.
Shah, Moore's Law, Continuous Everywhere But Differentiable Nowhere, Feb. 12, 2009, located on the Internet at: http://samjshah.com/2009/02/24/morres-law/, 5 pgs.
Sony Digital Camera User's Guide/ Trouble Shooting Operating Instructions, copyright 2005, located on the Internet at: https://www.sony.co.uk/electronics/support/res/manuals/2654/26544941M.pdf (attached as Exhibit 3 from the Defendant Wells Fargo Bank N.A.'s Answer dated Aug. 14, 2018), 136 pgs.
Sumits, Major Mobile Milestones—The Last 15 Years, and the Next Five, Cisco Blogs, Feb. 3, 2016, located on the Internet at: https://blogs.cisco.com/sp/mobile-vni-major-mobile-milesrones-the-last15-years-and-the-next-five, 12 pgs.
Wausau Financial Systems, Understanding Image Quality & Usability Within a New Environment, 2006, 22 pgs,.
Motomanual, Motorokr-E6-GSM-English for wireless phone, copyright 2006, 144 pgs.
Patent Disclaimer for US Patent No, 8,699,779, filed on Mar. 4, 2019, 2 pgs.
Patent Disclaimer for US Patent No, 8,977,571, filed on Feb. 20, 2019, 2 pgs.
Patent Disclaimer for US Patent No, 9,336,517, filed on Mar. 4, 2019, 2 pgs.
Patent Disclaimer for US Patent No, 9,818,090, filed on Feb. 20, 2019, 2 pgs.
CBM2019-00002 U.S. Pat. No. 9,818,090, United Services Automobile Association (USAAYs Patent Owner Preliminary Response, dated Feb. 20, 2019, 75 pgs,.
CBM2019-00002 Patent No, 9,818,090, Declaration of Tim Crews in Support of Patent Owner Preliminary Response, dated Feb. 20, 2019, 8 pgs.
CBM2019-00002 U.S. Pat. No. 9,818,090, Deciaration of Matthew Calm; n. In Support of Patent Owner Preliminary Response, dated Feb. 20, 2019, 14 pgs.
CBM2019-00002 U.S. Pat. No. 9,818,090, Katie Knight Videotape Deposition Transcript, dated Feb. 8, 2019, 27 pgs,.
CBM2019-00002 Patent No, 9,818,090, Peter Alexander, Ph.D., Oral and Videotaped Deposition, dated Jan. 23, 2019, 27 pgs.
CBM2019-00002 U.S. Pat. No. 9,818,090, United Services .Automobile Association (Usaa)'s Updated Exhibit List, dated Mar. 19, 2019, pgs.
CBNI12019-00003 U.S. Pat. No. 9,336,517, United Services Automobile Association (USAAys Patent Owner Preliminafy Response, dated Mar. 4, 2019, 91 pgs.
CBM2019-00003 Patent No, 8,699779, Declaration of Matthew Caiman in Support of Patent Owner Preliminary Response, dated Mar. 4, 2019, 15 pos.
CBM2019-00003 U.S. Pat. No. 9,338,517, Katie. Knight Videotape Deposition Transcript, dated Feb. 8, 2019, 27 pgs.
CBM2019-00003 Patent No, 9,336,517, Peter Alexander, Ph.D., Oral and Videotaped Depositon, dated Jan. 23, 2019, 27 pgs,.
CBM2019-00003 Patent No, 9,336,517, United Services Automobile Association (Usaa)'s Updated Exhibit List Pursuant to 37 Cfr 42.63(e), dated Mar. 19, 2019, 8 Pcfs,.
CBM2019-00003 U.S. Pat. No. 9,336,517, Petitioner's Reply Brief to Patent Owner Preliminary Response Pursuant to Authorization Provided in Paper No. 14, dated Apr. 10, 2019, 10 pgs,.
CBM2019-00004 Patent No, 8,977571, Declaration of Tim Crews in Support of Patent Owner Preliminary Response, dated Feb. 20, 2019, 8 pqs.
CBM2019-00004 U.S. Pat. No. 8,977,571, United Services .Automobile Association (Usaa)'s Patent Owner Preliminary Response, dated Feb. 20, 2019, 99 pgs.
CBNI12019-00004 U.S. Pat. No. 8,977,571, Deciaration of Matthew Calman in Support of Patent Owner Prelinlinary Response, dated Feb. 20, 2019, 14 pgs,.
CBM2019-00004 Patent No, 8,977,571, United =Services Automobile Association (USAAys Updated Exhibit List Pursuant to 37 Cfr 43,63(e), dated Mar. 19, 2019, 8 Ms.
CBM2019-00005 U.S. Pat. No. 8,699,779, United Services Automobile Association's (Usaa)'s Patent Owner Preliminary Response, dated Mar. 4, 2019, 103 pgs.
CBM2019-00005 Patent No, 8,699,779, Katie Knight Videotape Deposition Transcript, dated Feb. 8, 2019, 27 pgs.
CBM2019-00005 U.S. Pat. No. 8,699,779 Matthew A. Caiman Declaration, dated Mar. 4, 2019, 15 pgs.
CBM2019-00005 U.S. Pat. No. 8,699,779 Peter Aexander, Ph.D., Oral and Videotaped Deposition, dated Jan. 23, 2019, 27 pgs,.
CBM2019-00027 Patent No, 9,224,136 Declaration of Peter Alexander, Ph.D., dated Mar. 28, 2019, 147 pgs.
CBM2019-00027 U.S. Pat. No. 9,224,136 Petition for Covered Business Method Review of Claims 1-3, 5-9, 11-16 and 18 of US Patent No, 9,224,136, dated Mar. 28, 2019, 93 pgs.
CBM2019-00027 U.S. Pat. No. 9,224,136 Notice of Filing Date Accorded to Petition and Time for Filing Patent Owner Preliminary Response, dated Apr. 8, 2019, 3 pgs.
CBM2019-00028 Patent No, 10,013,681, Plaintiff United Services Automobile Association (Usaa) Preliminary Claim Constructions and Extrinsic Evidence, dated Mar. 15, 2019, 74 pgs.

(56) References Cited

OTHER PUBLICATIONS

CBM2019-00028 Patent No. 10,013,681, Declaration of Peter Alexander, Ph.D., dated Mar. 28, 2019, 94 pos,.
CBM2019-00028 Patent No. 10,013,681, Petition for Covered Business Method Review of Claims 1-30 of US Patent No, 10,013,681, dated Mar. 28, 2019, 99 pgs.
CBM2019-00028 Patent No. 10,013,681, Petitioner's Updated Exhibit List (as of Apr. 1, 2019) for US Patent No, 10,013,681, dated Apr. 1, 2019, 5 pgs.
CBM2019-00028 Patent No. 10,013,681, Notice of Filing Date Accorded to Petition and Time for Filing Patent owner Preliminary Response for US Patent No, 10,013,681, dated Apr. 8, 2019, 3 pgs.
CBM2019-00029 Patent No, 10,013,606, Declaration of Peter Alexander, Ph,D,, dated Mar. 28, 2019, 76 pgs.
CBM2019-00029 Patent No. 10,013,605, Petition for Covered Business Method Review of Claims 1-3, 5-14, 16-29 of US Patent No, 10,013,605, dated Mar. 28, 2019, 88 pgs.
CBM2019-00029 Patent No. 10,013,605, Plaintiff United Services Automobile As (Usaa)) Prelimina Claim Constructions and' Extrinsic Evidence, dated.
IPR2019-00815 Patent No, 9,818,090, Petition for Inter Partes Review of Claims 109 of U.S. Pat. No. 9,818,090, dated Mar. 20, 2019, 56 pgs.
IPR2019-00815 U.S. Pat. No. 9,818,090, Declaration of Peter Alexander, PhD. as filed in the Ipr on Mar. 20, 2019, 99 pgs.
IPR2019-00815 Patent No. 9;818,090, Notice of Filing Date Accorded to Petition and Time for Filing Patent Owner Preliminary Response, dated Mar. 27, 2019, 5 pgs.
IPR2019-00815 U.S. Pat. No. 9,818,090, Exhibit B Proposed Claim Constructions for the '571, '090, '779 and '517 Patents, filed on Feb. 28, 2019, 10 pgs.
Aba Routing System Transit Number, Wikipedia, dated Sep. 27, 2006, 3pgs.
Accredited Standards Committee Technical Report Tr 33/2006, dated Aug. 28, 2006, 75 pgs.
ANS X9.100-140-2004, "Specification for an Image Replacement document—IRD", American Standard for Financial Services, Oct. 1, 2004, 15 pgs.
ANSI News, Check 21 Goes Into Effect Oct. 28, 2004, dated Oct. 25, 2004, 1 pg.
ANSI, "Return Reasons for Check Image Exchange of IRDS", dated May 6, 2016, 23 pgs.
ANSI, "Specifications for Electronic Exchange of Check and Image Data", dated Jul. 11, 2006, 230 pgs.
ANSI X9.7-1999(R2007), Bank Check Background and Convenience Amount Field Specification, dated Jul. 11, 2007, 86 pgs.
ASCX9, "Specification for Electronic Exchange of Check and Image Data", date Mar. 31, 2003. 156 pgs.
Bankers' Hotline, "Training p. Learning the Bank Numbering System", Copyright 2004, 2 pgs.
BrainJar Validation Algorithms, archived on Mar. 16, 2016 from BrainJar.com, 2 pgs.
Canon White Paper, "Two Words Eve Business Should Know—Remote Deposit", dated 2005, 7 pgs.
CBR oniine, "Diebold iaunches ATM depository technology", Oct. 4, 2007, 5 pgs.
Cheq Information Technology White Paper, "Teller Scanner Performance and Scanner Design: Camera Position Reiative to the Feeder", dated 2005, 7 pgs.
De Jesus, Angie et al., "Distributed Check Processing in a Check 21 Environment", dated Nov., 2004, 22 pgs.
Federal Reserve Adoption of DSTU X9.37-2003, Image Cash Letter Customer Documentation Version 1.8, dated Oct. 1, 2008, 48 pgs.
Fielding, R. et al, "RFC-2616—Hypertext Transfer Protocol", Network Working Group. The Internet Society copyright 1999, 177 pgs.

Hill, Simon, "From J-Phone to Lumina 1020: A Complete History of the Camera Phone", dated Aug. 11, 2013, 19 pgs.
Instrument—Definition from the Merriam-Webster Online Dictionary, dated Mar. 2, 2019, 1 pg.
Instrument—Definition of instrument from the Oxford Dictionaries (British & World English), dated Jul. 2, 2017, 44 pgs.
iPhone Application Programming Guide Device Support, dated Apr 26, 2009, 7 pgs.
iPhone Announces the New iPhone 3gs—The Fastest, Most Powerful iPhone Yet, Press Release dated Jun 8, 2009, 4 pgs.
Klein, Robert, Financial Services Technology, "Image Quality and Usability Assurance: Phase 1 Project", dated Jul. 23, 2004, 68 pgs.
Lange, Bill, "Combining Remote Capture and IRD Printing, A Check 21 Strategy for Community and Regional Banks", dated 2005, 25 pgs.
Lee, Jeanne, "Mobile Check Deposits: Pro Tips to Ensure They Go Smoothly", dated Feb. 19, 2016, 6 pgs.
Meara, Bob, "State of Remote Deposit Capture 2015: Mobile Is the New Scanner", dated May 26, 2015, obtained from the Internet at: https://www.celent.com/insights/57842967, 3 pgs.
Meara, Bob, "State of Remote Deposit Capture 2015 Mobile Is the New Scanner", dated May 2015, 56 pgs.
Meara, Bob,"USAA's Mobile Remote Deposit Capture", dated Jun. 26, 2009, 2 pgs.
Mitek's Mobile Deposit Processes More Than Two Biliion Checks, $1.5 Trillion in Cumulative Check Value, dated Mar. 18, 2018, 2 pgs.
Mitek, "Video Release—Mitek MiSnap™ Mobile Auto Capture Improves Mobile Deposit® User Experience at Ten Financial Institutions", dated Jul. 15, 2014, 2 pgs.
NCR, Mobile Remote Deposit Capture (RDC), copyright 2011, 8 pgs.
Nokia N90 Review Digital Trends. dated Feb. 11, 2019, obtained from the Internet at: https://www.digitaltrends.com/cell-phone-reviews/nokia-n90-review/, 11 pgs.
Nokia N95 8GB User Guide, copyright 2009, (from the Wells Fargo Bank, N.A. IPR2019-00815, filed on Mar. 20, 2019), Part 1 of 3, 67 pgs.
Nokia N95 8GB User Guide, copyright 2009, (from the Wells Fargo Bank, N.A. IPR2019-00815, filed on Mar. 20, 2019), Part 2 of 3, 60gs.
Nokia N95 8GB User Guide, copyright 2009, (from the Wells Fargo Bank, N.A. IPR2019-00815, filed on Mar. 20, 2019), Part 3 of 3, 67 pgs.
Patel, Kunur, Ad Age, "How Mobiie Technology is Changing Banking's Future", dated Sep. 21, 2009, 3 pgs.
Remote Deposit Capture Basic Requirements, dated Aug. 22, 2009, 1 pg.
Remote Deposit Capture.com Scanner Matrix, dated Oct. 21, 2011, 3 pgs.
Rowles, Tony, USAA-v. Wells Fargo No. 2:16-cv-245-Jrgl e-mail correspondence dated Jan. 24, 2019, 2 pgs.
Sechrest, Stuart et al., "Windows XP Performance", Microsoft, dated Jun. 1, 2001, 20 pgs.
Spenser, Harvey, "White Paper Check 21 Controlling Image Quality At the Point of Capture", dated 2004, 7 pgs.
Timothy R. Crews list of Patents, printed from the United States Patent and Trademark Office on Feb. 13, 2019, 7 pgs.
Van Dyke, Jim, "2017 Mitek Mobile Deposit Benchmark Report", copyright 2017, 50 pgs.
Wausau, "Understanding Image Quality & Usability Within a New Environment", copyright 2019, 1 pg.
Whitney, Steve et al., "A Framework for Exchanging Image Returns", dated Jul. 2001, 129 pgs.

* cited by examiner

SYSTEMS AND METHODS FOR MOBILE DEPOSIT OF NEGOTIABLE INSTRUMENTS

CROSS-REFERENCE TO RELATED APPLICATIONS

This application claims the benefit of U.S. Provisional Application No. 61/026,977, filed Feb. 27, 2008 and entitled "SYSTEMS AND METHODS FOR MOBILE DEPOSIT OF NEGOTIABLE INSTRUMENTS"; the entire disclosure of which is hereby incorporated by reference into the present disclosure. In addition this application is related by subject matter to that disclosed in the following commonly assigned applications, the entirety of which are hereby incorporated by reference herein: U.S. patent application Ser. No. 12/195,732 and U.S. patent application Ser. No. 12/195,745, each filed on Aug. 21, 2008 and each entitled "Systems And Methods For Mobile Deposit Of Negotiable Instruments."

BACKGROUND

Customers demand more of the products and services they use than ever before. They insist that the companies they deal with provide them greater levels of access and information. One of the methods of providing this increased information and access has been through the mobile telephone channel. Mobile services, enabled through slimmed down interfaces, have proliferated. Customers can receive alerts over a mobile channel, they can check the minutes left on their mobile voice plan, and through pre-set shorthand access numbers vote for their favorite contestant on a reality show.

Mobile banking is in its infancy. Customers have very limited access to their account information. One of the reasons for this limited access is a perceived lack of security over a mobile channel. In a bank branch, a person's identity can be visually verified. Over a web channel, they are required to authenticate themselves. However, on the mobile channel financial institutions are forced to operate through the Simple Message System (SMS) or through a very limited interface (both in screen resolution and in the throughput of the data channel) that provides little or no authentication facility.

SUMMARY

An image of a negotiable instrument may be taken by a camera associated with a mobile device and provided from a user to a financial institution via the mobile device. The negotiable instrument may be deposited in a user's bank account based on the image. Any technique for sending the image to the financial institution may be used.

In an implementation, the mobile device may process the image prior to sending the image to the financial institution. Additionally or alternatively, the financial institution may process the image.

In an implementation, processing the image may comprise one or more cleaning operations at the mobile device, the camera, and/or the financial institution. Cleaning operations may include at least one of the following for example: deskewing the image, dewarping the image, converting the resolution of the image to a predetermined resolution, converting the image from JPEG to TIFF, detecting information from the negotiable instrument, verifying non-duplicate presentment, and verifying signature.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

In the following detailed description of example embodiments, reference is made to the accompanying drawings, which form a part hereof and in which is shown, by way of illustration, specific embodiments in which the example methods, apparatuses, and systems may be practiced. It is to be understood that other embodiments may be used and structural changes may be made without departing from the scope of this description.

Figure 1:
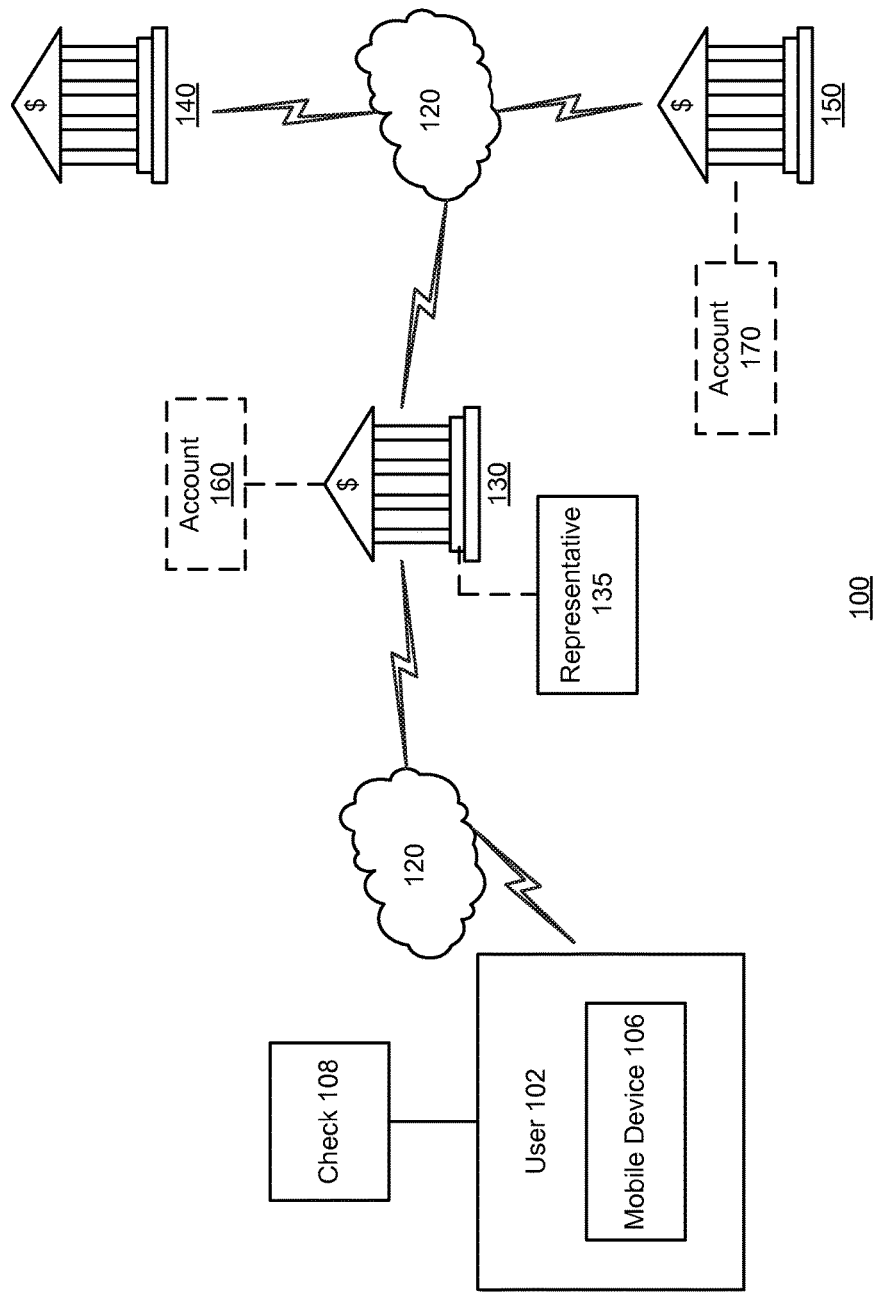
FIG. 1 is a block diagram of an implementation of a system in which example embodiments and aspects may be implemented.

FIG. 1 is a block diagram of an implementation of a system 100 in which example embodiments and aspects may be implemented. System 100 may include an account owner, referred to herein as a user 102, and financial institutions 130, 140, and 150, which may be any type of entity capable of processing a transaction involving a negotiable instrument. For example, financial institutions 130, 140, and 150 may be a retail bank, an investment bank, an investment company, a regional branch of the Federal Reserve, a clearinghouse bank and/or a correspondent bank.

A negotiable instrument typically includes a type of contract that obligates one party to pay a specified sum of money to another party. Negotiable instrument as used herein is an unconditioned writing that promises or orders payment of a fixed amount of money. One example of a negotiable instrument is a check. The check may be presented from a first person to a second person to affect the transfer of money from the first person to the second person.

It may also include a check that is presented from a company or business to a person. In either case, the check may be taken by the receiving party and deposited into an account at a financial institution of the receiving party. This has required that the receiving party endorse the check and then present it for deposit at a bank branch. However, recent innovations have taken place that have enabled the receiving party to deposit the funds without visiting the bank branch, such as via automated teller machines (ATM). In addition to a check, negotiable instruments may include a draft, a bill of exchange, a promissory note, and the like.

The user 102 may be an individual who owns account 160 that may be held at financial institution 130. Account 160 may be any type of account for depositing funds, such as a savings account, a checking account, a brokerage account, and the like. The user 102 may communicate with financial institution 130 by way of communications network 120 such as an intranet, the Internet, a local area network (LAN), a wide area network (WAN), a public switched telephone network (PSTN), a cellular network, a voice over Internet protocol (VoIP) network, and the like. The user 102 may communicate with financial institution 130 by phone, email, instant messaging, facsimile, and the like. Financial institutions 130, 140, and 150 also may communicate with each other by way of communications network 120.

In an implementation, the user 102 may receive payment from another individual such as a payor in the form of a check 108 or other negotiable instrument that is drawn from account 170 at financial institution 150. The user 102 may endorse the check 108 (e.g., sign the back of the check 108) and indicate an account number on the check 108 for depositing the funds. It is noted that although examples described herein may refer to a check, the techniques and systems described herein are contemplated for, and may be used for, deposit of any negotiable instrument.

As described further herein, a digital image of a check or other negotiable instrument may be provided from a user to a financial institution, and the digital image may be processed and funds associated with the check or negotiable instrument in the digital image may be deposited in a user's bank account. The user 102 may deposit the check 108 into account 160 by making a digital image of the check 108 and sending the image file containing the digital image to financial institution 130. For example, after endorsing the check 108, the user 102 may use a mobile device 106 that comprises a camera to convert the check 108 into a digital image by taking a picture of the front and/or back of the check 108. The mobile device 106 may be a mobile phone (also known as a wireless phone or a cellular phone), a personal digital assistant (PDA), or any handheld computing device, for example.

In an implementation, the user 102 may send the digital image(s) to financial institution 130 using the mobile device 106. Any technique for sending a digital image to financial institution 130 may be used, such as providing a digital image to a website associated with financial institution 130 from storage, emailing a digital image to financial institution 130, or sending a digital image in a text message or instant message, for example.

Financial institution 130 may receive a digital image representing the check 108 and may use any known image processing software or other application(s) to obtain the relevant data of the check 108 from the digital image. Financial institution 130 may determine whether the financial information associated therewith may be valid. For example, financial institution 130 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the financial information and may receive the digital image from the user 102.

The electronic devices may receive the digital image and may perform an initial analysis on the quality of the digital image, the readability of the data contained therein, or the like. For example, the electronic devices may determine whether the account number, amount payable, and the like may be readable such that it may be parsed or otherwise obtained and processed by the financial institution to credit an account 160 associated with the user 102 and debit an account associated with the payor. In an implementation, a representative 135 of financial institution 130 may provide assistance to the user 102 and may provide assistance in determining whether the financial information may be readable and/or of a good enough quality to be processed, as described further herein.

Upon receipt and approval of the digital image, financial institution 130 may credit the funds to account 160. Financial institution 130 may clear the check 108 by presenting a digital image of the check 108 captured from the digital image to an intermediary bank, such as a regional branch of the Federal Reserve, a correspondent bank and/or a clearinghouse bank. For example, the check 108 may be cleared by presenting the digital image to financial institution 140, which may be a regional branch of the Federal Reserve, along with a request for payment. Financial institutions 130 and 150 may have accounts at the regional branch of the Federal Reserve. Financial institution 130 may create a substitute check using the image provided by the user 102 and present the substitute check to financial institution 140 for further processing. Upon receiving the substitute check, financial institution 140 may identify financial institution 150 as the paying bank (e.g., the bank from which the check 108 is drawn). This may be accomplished using a nine-digit routing number located on the bottom left hand corner of the check. A unique routing number is typically assigned to every financial institution in the United States. Financial institution 140 may present the substitute check to financial institution 150 and request that the check be paid. If financial institution 150 verifies the check (i.e., agrees to honor the check), financial institution 140 may then settle the check by debiting funds from financial institution 150 and crediting funds to financial institution 130. Financial institution 150 may then debit funds from account 170.

It will be appreciated that the preceding examples are for purposes of illustration and explanation only, and that an embodiment is not limited to such examples. For example, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check 108 may be cleared internally.

Figure 2:
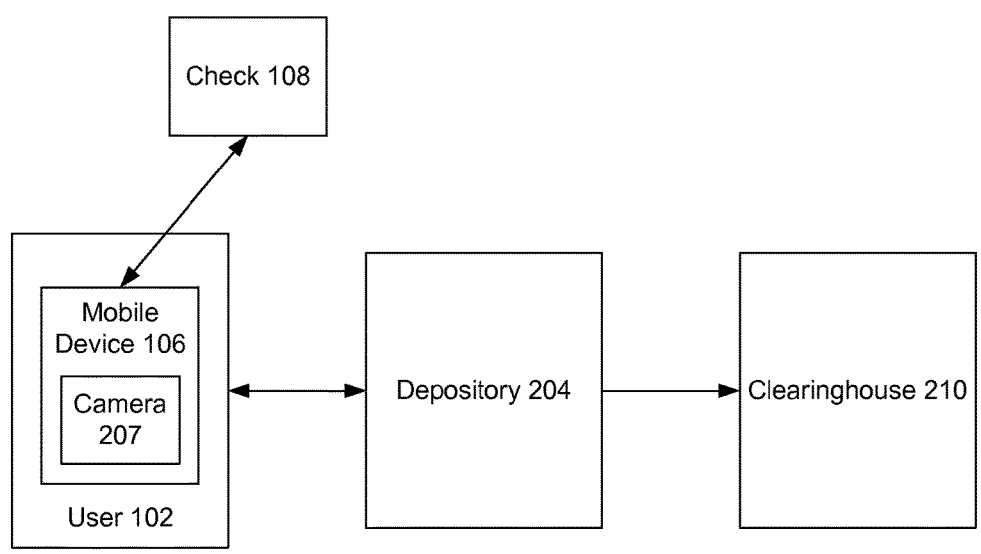
FIG. 2 shows a high-level block diagram of an implementation of a system that may be used for the deposit of a negotiable instrument.

FIG. 2 shows a high-level block diagram of an implementation of a system 200 that may be used for the deposit of a negotiable instrument. As described further herein, the user 102 may deposit the funds of the negotiable instrument using the camera functionality in the mobile device 106. In the example of one person giving a check to another person, this would enable the receiving party to deposit the funds at that time, without physically visiting an ATM or a bank branch.

In an implementation, the system 200 may include the user 102 and a depository 204. The mobile device 106 may comprise a camera 207, such as a digital camera. Such a mobile device may be called a camera phone. The mobile device 106, through the camera 207, has the ability to take or capture a picture or digital image of the check 108 or other negotiable instrument.

In an implementation, the camera 207 may take an image of the front of the check 108. Alternatively, the camera 207 may take an image of both the front and the back of the check 108. The back of the check may provide endorsement verification, such as the signature of the person or party the check is made out to. This may also include stamps, such as checks received at a merchant.

The depository 204 may include a bank in which the user 102 has a deposit account; however, the present disclosure is not limited to just banks. Alternatively, a third party may act as the depository 204 providing functionality to a plurality of users without regard to the bank at which they have deposit accounts, or whether their individual bank allows for the methods and systems described herein.

The depository 204, in an implementation, after receiving the image(s) of the check 108 from the user 102, may use a clearinghouse 210 to perform the check clearing operations. As described with respect to the system 100 of FIG. 1, check clearing operations are used by banks to do the final settlement of the check 108, such as removing funds from the account of the payor and transferring those funds to the user's bank. The user's bank may choose to make the funds available to the user 102 immediately and take on the risk that the check 108 does not clear. However, for various reasons, the bank may only make those funds available to the user 102 after the check 108 finally clears.

Figure 3:
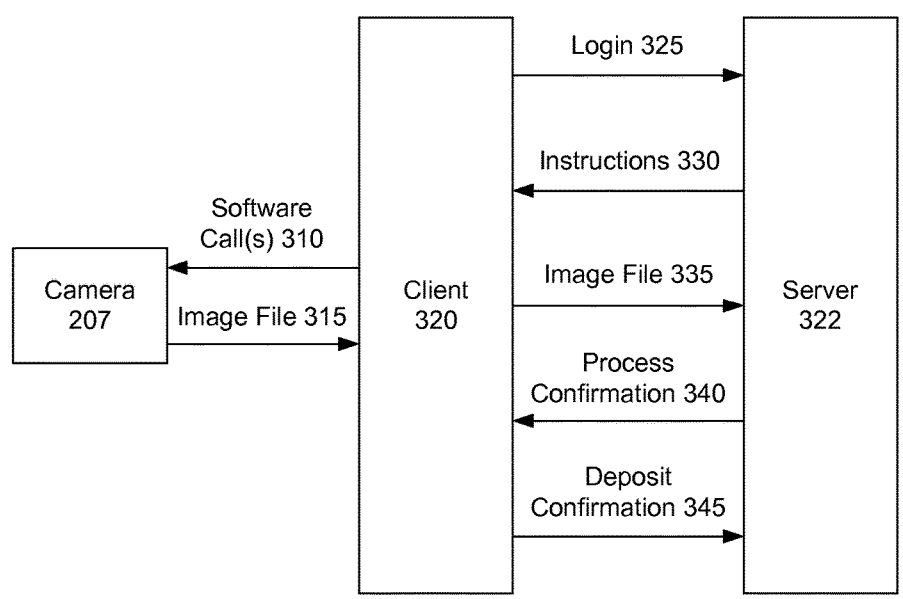
FIG. 3 shows a data-flow diagram of a system for the deposit of a negotiable instrument, in accordance with an example embodiment.

FIG. 3 shows a data-flow diagram of a system 300 for the deposit of a negotiable instrument, in accordance with an example embodiment. In the data-flow diagram of FIG. 3, a client 320 is one example of the mobile device 106 of the user 102 described with respect to the systems 100 and 200 of FIGS. 1 and 2, respectively. In an implementation, a server 322 may be a software component operable by the depository 204 of FIG. 2.

The client 320 may log in to a remote deposit system executed on the server 322. The login 325 may serve to authenticate the user 102 as an authorized consumer of the depository 204.

The server 322, in one example, may send instructions 330 to the client 320 that execute an application on the client 320. This may include instructions that cause a software object, which may have been previously downloaded and installed on the client 320, to be executed on the client 320.

In another example, the instructions 330 may include a wholly self-contained application that when delivered to the client 320 will execute and perform one or more operations described herein. In either example, the software object may be configured to make one or more software calls 310 to a digital camera, such as the camera 207 associated with the mobile device 106. This may be through specific software instructions to the camera. In other words, the camera's functionality may not be abstracted through any software library. In such an example, software code may be written and delivered to every different camera-equipped mobile phone.

In an alternate example, the software object may operate through a software abstraction layer, such as an application programming interface (API). The software object developer may only insert code into the software object to call one or more APIs exposed by the software operating the mobile device. One example of such software is Windows Mobile by Microsoft Corporation. In the context of a Windows Mobile device, the Windows Mobile operating system (OS) has one or more APIs exposed to application developers that will translate instructions from applications into instructions operable by the camera 207 on the mobile device 106. A mobile operating system, also known as a mobile platform or a handheld operating system, is the operating system that controls a mobile device. Other mobiles OSs include Symbian OS, iPhone OS, Palm OS, BlackBerry OS, and Android.

The software object may cause the camera 207 to take a picture or capture one or more images of the check 108 being deposited. These images may be captured sequentially, e.g., pursuant to the user 102 flipping the check 108 over after an image of the front of the check 108 has been captured. However, each side of the check 108 may be captured by the camera 207 using similar API calls. The images may be stored in an image file 315.

Once the images of one or both sides of the check 108 are captured by the camera 207, the image file 315 may be operated on by the software object of the client 320. These operations may include any of the following: deskewing, dewarping, magnetic ink character recognition (MICR), cropping (either automatically, or having the user 102 manually identify the corners and/or edges of the check 108 for example), reducing the resolution of the image, number detection, character recognition, and the like.

With respect to number and character recognition, commercial check scanners have used characteristics of the MICR encoding to detect information about the check, such as the bank's routing number and the account number. However, the characteristics that these scanners have used are the magnetic characteristic of the ink itself and these scanners have used methods similar to those of magnetic audio tape readers. In an implementation, a software object of the client 320 may optically recognize the characters on the MICR line, as a consumer mobile device such as the mobile device 106 will lack the magnetic reading ability of a commercial check scanner.

The image may be also down converted into a grayscale or black and white image, such as either in Joint Photographic Experts Group (JPEG) compliant format or in tabbed image file format (TIFF) for example. In an alternate example, the image may be formatted as a Scalable Vector Graphics (SVG) image. One of the benefits of an SVG file is a large size advantage over JPEG. In the former example, the image at some point before entry into the clearing system may be converted to TIFF format. This may be performed at the mobile device 106, wherein the camera 207 captures the image in TIFF format. However, the camera 207 of the mobile device 106 may capture the image in JPEG format, which may then be converted into TIFF either at the mobile device 106 or at the server 322. In the latter example, this may use the transmission of the TIFF image across a communications network which may be more advantageous as TIFF images are typically smaller in file size for the same size of picture as a JPEG formatted image.

The software object on the client 320 may operate by performing one or more of the operations described herein and then transmitting an image file 335 (e.g., based on image file 315 that has been processed) to the server 322 after the user 102 confirms that they do wish to deposit the check 108. Alternately, the software object may capture the image of the check 108 and transmit that image to the server 322 that in turn may perform those operations, verifies that the image quality is within acceptable thresholds, and communicates that verification back to the client 320, which can then instruct the user 102 to take a picture of the other side of the check 108. In this example, the image transmitted to the server 322 may be in any format, such as JPEG or TIFF, insofar as the server software has the ability to convert that image into a Check 21 compliant format. Alternately, the bank may output an X9.37 file to the clearing system. The Check Clearing for the 21st Century Act (or Check 21 Act) is a United States federal law that allows the recipient of a paper check to create a digital version, thereby eliminating the need for further handling of the physical document. The Check 21 standard for electronic exchange is defined in the standard DSTU X9.37-2003 ("X9.37"). It is a binary interchange format.

The server 322 may confirm (e.g., using a process confirmation 340) with the user 102 the transmission, reception, and processing of each side of the check 108 separately, or may confirm both sides at the same time. On the server side, more operations may be performed, such as signature verification. Where to perform these operations may be determined by the processing power of the mobile device 106 itself, which is typically limited in computational power. However, the present discussion is not limited in any way by discussion of where certain operations are described as operating. The operations of detecting and verifying information may be performed by the client 320 before the information is transmitted along with the image in the image file 335 to the server 322. Alternately, the software object operating on the mobile device 106 may perform no operation other then capturing images of the front and back of the check 108, receiving confirmation that the user 102 wishes to proceed, and transmitting those images to the server 322, wherein the server 322 performs those operations.

In an implementation, after the image file 335 has been received by the server 322, the server 322 may send a process confirmation 340 to the client 320. The process confirmation 340 may request instructions from the client 320 to continue proceeding with the deposit now that the server 322 has received the image file 335. In response, the client 320 may send a deposit confirmation 345 to the server 322, instructing the server 322 to process the deposit of the check based on the image file 335 that had been received by the server 322.

Figure 4:
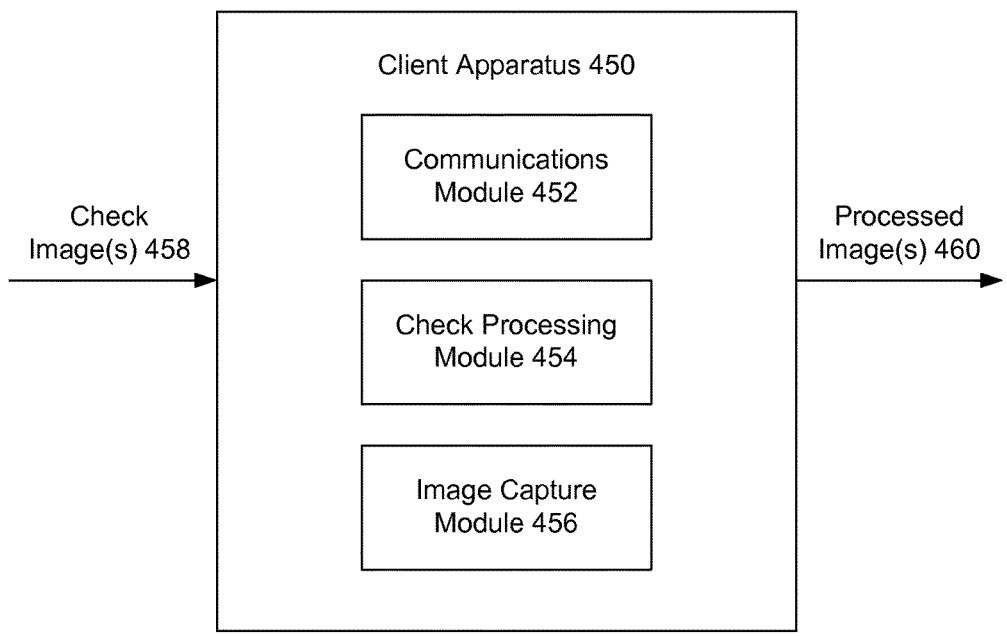
FIG. 4 shows a block diagram of a client apparatus for the deposit of a negotiable instrument, in accordance with an example embodiment.

FIG. 4 shows a block diagram of a client apparatus 450 for the deposit of a negotiable instrument, in accordance with an example embodiment. The client apparatus 450 may include one or more software objects operating on a mobile device 106, such as described above. The client apparatus 450 may include a communications module 452, a check processing module 454, and an image capture module 456. The client apparatus 450 may receive, in one example, one or more check images 458 as an input and output one or more processed images 460.

In an implementation, the check images 458 may be received following a software call from the check processing module 454 to the image capture module 456. In such an implementation, the image capture module 456 may include the camera 207 contained within the mobile device 106. Alternately, the camera 207 may be detachably coupled to the mobile device 106 such as through a secure digital (SD) slot or over any suitable communications bus, such as USB (universal serial bus).

Figure 5:
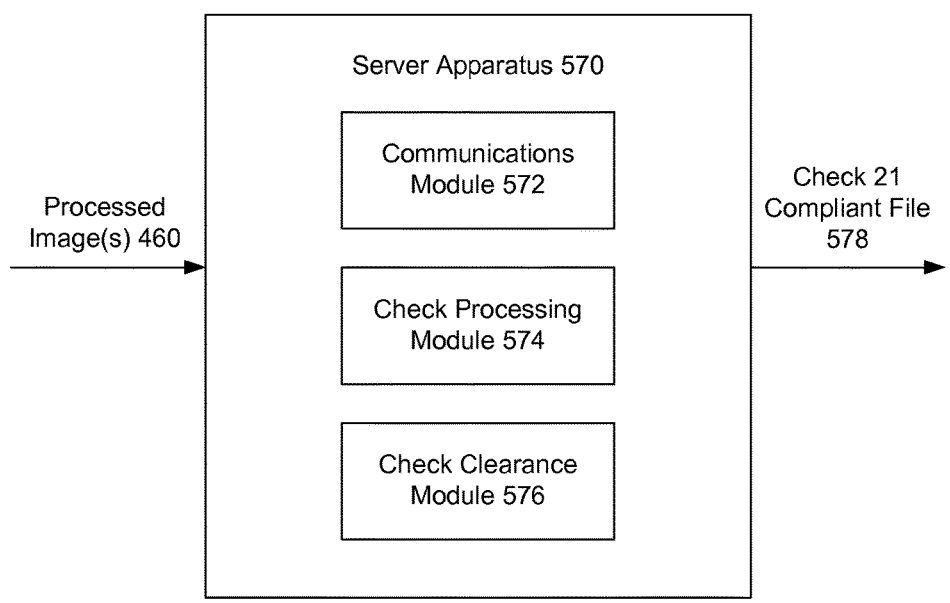
FIG. 5 shows a block diagram of a server apparatus for the deposit of a negotiable instrument, in accordance with an example embodiment.

In an implementation, the image capture module 456 may retrieve previously captured and stored image files (e.g., in local, remote, or removable storage associated with the client apparatus 450) and send the image files to a financial institution (e.g., financial institution 130, the server 322, the server apparatus 570 of FIG. 5, etc.) for processing.

In an implementation, the client apparatus 450 may comprise a browser such as a web browser, for accessing a website on the Internet or other network associated with a financial institution. The user may access the website and select a "capture image" link or similar icon, button or link, for example, displayed on the browser. Such a selection may call the image capture module 456 on the client apparatus 450.

The communications module 452 may be configured, in one example, to receive and send data signals over a suitable communications network. This may include, without limitation, GSM/GPR3, HSDPA, CDMA, TDMA, 802.11, 802.16 and the like. While the bandwidth available to the mobile device 106 may be an implementation concern such discussion is outside the scope of the present discussion and any suitable wireless communications network is considered to be within the scope of the present discussion. With respect to the present discussion, the communications module 452 may receive one or more processed check images 460 from the check processing module 454 and may transmit them over the suitable communications network to the depository 204, as described herein.

The check processing module 454 may be configured, in one example, to cause the image capture module 456 to capture a digital image of at least one side of a check. The check processing module 454 may then perform one or more cleaning operations on the image of the check. These cleaning operations, at a high level, are intended to ensure that the image of the check is suitable for one or more processing tasks. For instance, if the check is rotated 45 degrees clockwise when captured, the check processing module 454 or a software object operated on the server 322 described above may be unable to optically detect information on the check. In this example, the check processing module 454 may deskew the image such that the image was no longer rotated.

Another aspect of an image that may be cleaned is a warping of the image. Warping, as used herein, is meant to denote that the check is tilted forward or back with respect to a plane that is perpendicular to a line drawn from the camera lens to the center of the check. Warping, or tilting, of the image may also lead to incorrect optical detection of the check. In an implementation, the check processing module 454 may dewarp the check image such that, in a three-dimensional space, the check would appear to be perpendicular to an imaginary line drawn from the center of the camera lens to the center of the check itself.

The check processing module 454, in further examples, may perform one or more other cleaning or processing operations. This may include down-converting the image received from the image capture module to a suitable size, such as 200 dots per inch (DPI) resolution or in a resolution range such as 200 DPI to 400 DPI, 300 DPI to 500 DPI, etc., and/or converting the image to grayscale or black and white. Such operation(s) may reduce the file size of the check image.

Alternatively, the check processing module 454 may send instructions to the image capture module 456 to cause the image capture module 456 to capture an image of the check at a suitable resolution. The check processing module 454 may additionally perform any of the following operations, in further examples: convert from JPEG to TIFF, detect check information, perform signature detection on the image of the check, and the like. The check processing module 454 may, alternatively, send the captured check image to the server described herein for such processing, and receive confirmation that the operations were completed before further operations can proceed.

One of the issues with check processing is to detect the presence of a check against whatever background is present. While a user may be instructed to place the check on a dark or black background, such instructions may not provide a positive user experience. Alternatively or additionally, edge detection may be used to detect the check. Edge detection techniques have been described in other articles and any suitable method may be used herein. Alternative or additional methodology for check detection may use tile-cropping to detect and process the check.

As discussed above, the size of the file sent between the mobile device and the server may be small. This runs counter with respect to automatic check detection against a background. If captured in color, the contrast between check and background becomes easier. However, the processed image sent over the communications network may need to be smaller, and if the detection operation is performed by the server, it may be advantageous to convert the captured image to grayscale, or even black and white, before transmission to the server. Grayscale images are compliant with the Check 21 Act.

While "flat" is a fairly well known term to users, each user's appreciation of flat with respect to the camera lens of the camera 207 associated with the mobile device 106 may result in a problem with needing to align the check image programmatically or risk rejecting a large number of check images. As the image captured is a set of pixels, a tilted image will result in a jagged polygon rather then a perfect rectangle. Using convex hull algorithms, the check processing modules may create a smooth polygon around the boundary and remove the concavity of the check image. Alternatively, a rotating calipers algorithm may be used to determine the tightest fitting rectangle around the check boundary, which can then be used to determine the angle of it, with that angle being used to align the check properly.

The operator of the camera 207 may introduce distortions in the image due to a perspective problem, specifically an angling of the camera vertically over the check, and the top of the check is smaller then the bottom, or the reverse. A warping transformation algorithm (e.g., which may be exposed as a software call within Java advanced imaging) may be used to remove this distortion.

If user involvement is tolerated, the user may be queried to supply or identify three of the four corners of the check. In such an operation, the fourth corner may be derived, showing the perimeter of the check. This may allow a software object described herein to use less computational resources in processing the image of the check.

FIG. 5 shows a block diagram of a server apparatus 570 for the deposit of a negotiable instrument, in accordance with an example embodiment. The server apparatus 570 may include one or more software objects operating on a server operated by the depository 204 described above with respect to FIG. 2. The server apparatus 570 may include a communications module 572, a check processing module 574, and a check clearance module 576. The server apparatus 570 may receive one or more processed images 460 from a mobile device 106 or a client apparatus 450 as an input and may output a file such as a Check 21 compliant file 578. The Check 21 compliant file 578 may be a file or entry in a record set that is compliant with the clearinghouse rules set forth in the Check 21 Act and may include outputting an X9.37 file, in one example.

The communications module 572 may be configured to receive a wireless communication from the mobile device 106 over any suitable communications network, such as those described above. The communications module 572 may additionally receive a communication over a different communications network than the mobile device 106 communicated on, such as receiving the communication over a TCP/IP (Transmission Control Protocol/Internet Protocol) connection from the user's communication provider.

The check processing module 574 may be configured, in one example, to perform one or more check processing operations on the processed image(s) 460 that are received. In an implementation, these operations may include any of the operations described herein with respect to the check processing module 454 of FIG. 4. The operation of signature verification may be performed by the check processing module 574 of the server apparatus 570 as the server apparatus 570 may interface with other systems of the depository 204 that may maintain previously verified signature samples of the user 102. Performing signature verification at the client apparatus 450 may be computationally unfeasible; additionally, there may be a security risk if the signature sample is stored on the user's own device.

A cropped grayscale image may be sent to the server apparatus 570. The server apparatus 570 may perform further processing to remove distortion such as warping. The server apparatus 570 may extract information via a TIFF conversion and determine the DPI and re-scale to the proper DPI (e.g., convert to TIFF and detect the DPI that was used in the grayscale image). In an implementation, DPI detection may run on the client apparatus 450.

The check clearance module 576 may be configured, in one example, to receive a file from the check processing module 574 and may communicate with a check clearinghouse such that a Check 21 compliant file may be delivered to the check clearinghouse and funds may be received by the depository 204. The availability of the funds to the user 102 may be delayed by this operation such that the user 102 only has access to those funds when the depository 204 receives confirmation that the check has cleared.

Figure 6:
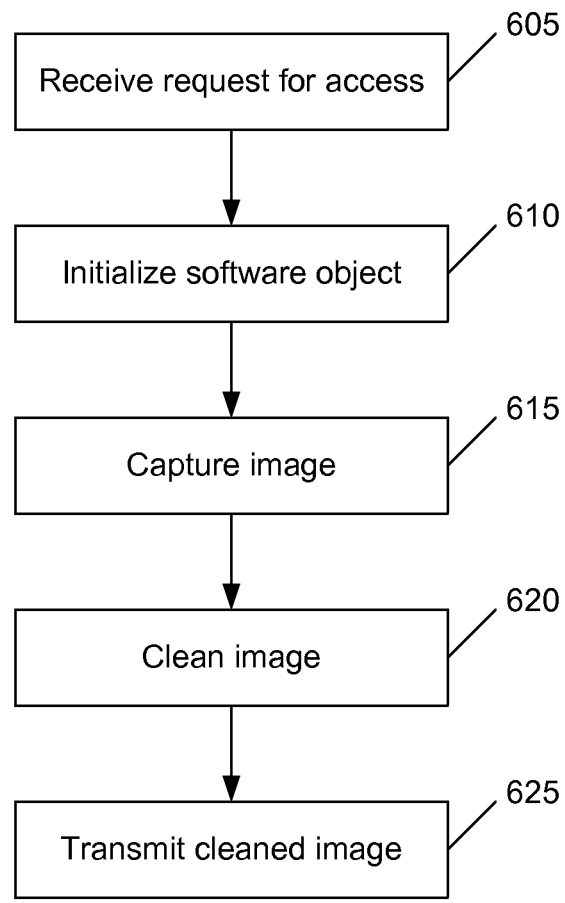
FIG. 6 is an operational flow of an implementation of a method that may be used for deposit of a negotiable instrument.

FIG. 6 is an operational flow of an implementation of a method 600 that may be used for deposit of a negotiable instrument. At 605, a request for access may be received from a user. The user may request access to a deposit system operated by a depository as described above by way of a mobile device, such a cellular phone, a PDA, a handheld computing device, etc. operated by the user. The access may be through some sort of user login, in some examples. The deposit system may be configured to receive a deposit of a negotiable instrument, such as a check, money order, cashier's check, etc. from the user and clear the negotiable instrument in a suitable clearinghouse system.

At 610, the system may initialize a software object on the mobile device. This may include sending instructions to the mobile device intended to execute a previously installed software object. Alternatively, the system may send a software object to the mobile device that may execute the software object, carry out operations described herein by use of the software object, and terminate the software object. In an implementation, the system may instruct a camera associated with the mobile device to capture an image of the negotiable instrument.

At 615, an image of the check may be captured. This may be accomplished through the software object accessing a camera associated with the mobile device (e.g., either comprised within the mobile device or separate from the mobile device). This may be done through an API exposed by the OS of the mobile device, or may be through software code customized for a specific phone and specific camera. With respect to the former, a developer of the software object may write code to the camera API(s), which may be specific to the OS and without regard to the camera on the device.

At 620, the image may be cleaned. Cleaning may include converting the image from JPEG format to TIFF format. Other cleaning operations are described herein. Cleaning operations may also be augmented by detecting operations. The operations at 620 may be carried out on the mobile device, in an implementation, though may include sending the image to the server apparatus, which may perform one or more cleaning operations and when complete may send a notification back to the mobile device of the completion. In either instance, the image may be deskewed, dewarped, and cropped for example, at block 620. Additionally, detection operations may be performed, e.g. after the cleaning operations are performed. The detection operations may include any of the following: optically read the MICR line, courtesy amount recognition (CAR), legal amount recognition (LAR), signature block, and payee. As discussed above, the detecting operations may be performed by the client, the server, or some combination thereof.

At 625, the cleaned image may be transmitted to the depository. This may include transmitting the cleaned image alone to the depository, but may also include transmitting the detected information on the check to the depository.

Figure 7:
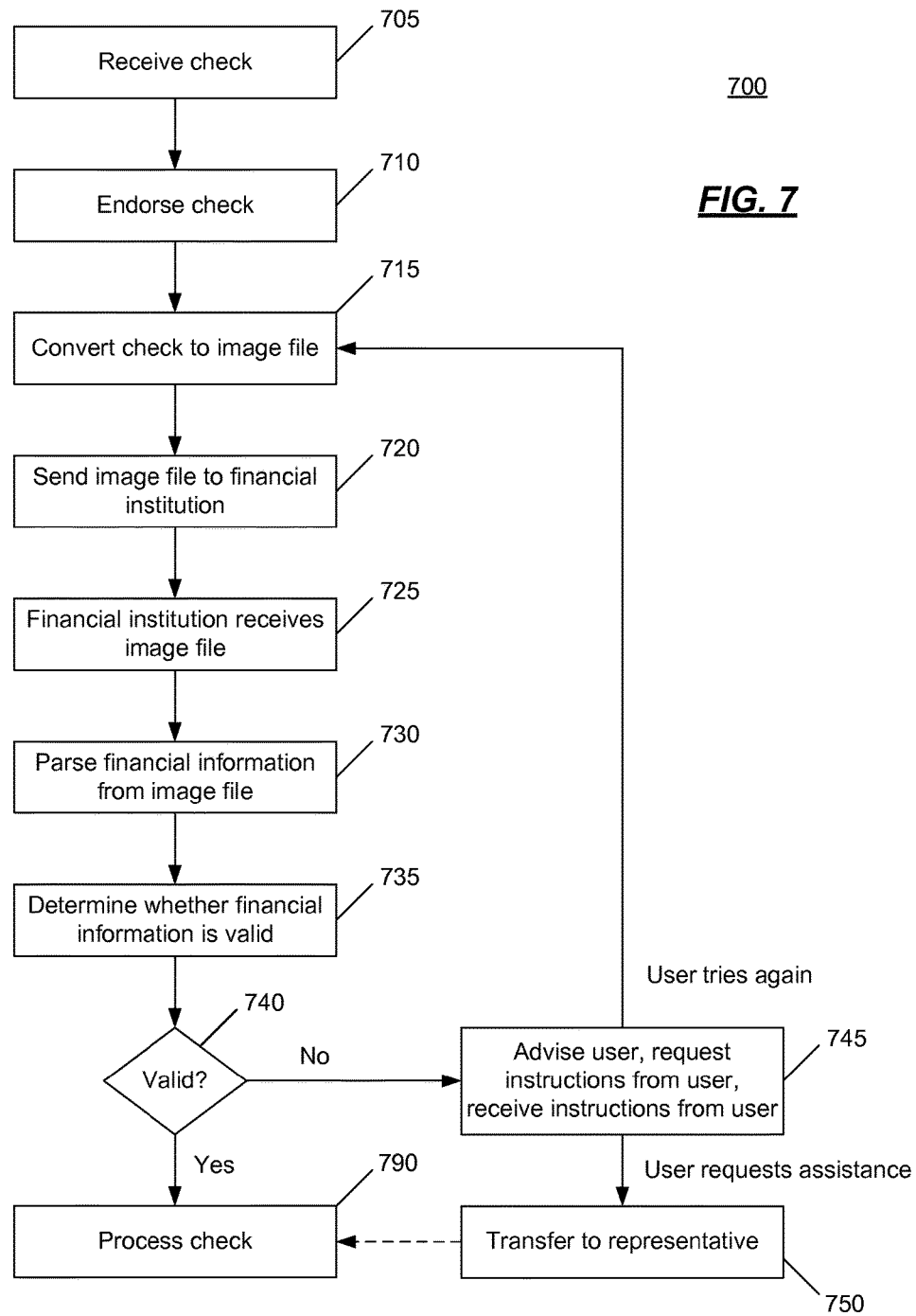
FIG. 7 is an operational flow of another implementation of a method that may be used for deposit of a negotiable instrument.

FIG. 7 is an operational flow of another implementation of a method 700 that may be used for deposit of a negotiable instrument. At 705, a user (e.g., an account owner, payee, etc.) may receive a check from a third party (i.e., a payor). At 710, the user may endorse the check by signing the back of the check in the designated field. If the user wishes to deposit the check into an account, such as a savings and/or checking account, they also may write an account number below the signature.

At 715, the user may convert the check into an image file that comprises electronic data representing an image of the check. For example, the user may create an image file comprising an image of the first side of the check, the second side of the check, or both. In an implementation, the image file may be created using a digital camera. The digital camera may be comprised within mobile device or may be separate from the mobile device and detachably connectable to the mobile device.

At 720, the user may transmit the image file to a financial institution, such as a bank, that may be associated with an account for depositing funds. For example, the user may send the image file of the check to the financial institution by attaching the image file to an email. Alternatively, the image file may be sent using various means, including, but not limited to, an Internet connection via a website of the financial institution or a wireless cellular transmission. In an implementation, the image file may be sent to the financial institution via streaming.

Additionally, the image file may be augmented by secondary data, which may be information relating to the check, such as an account number, a deposit amount, or a routing number associated with the check, and/or relating to the account for depositing funds, such as the account number and/or the name on the account. The account number may appear on the check itself, below the signature endorsing the check. The account number and/or name on the account also may appear in an email, either with or without the image file, for example. The user may send the image file and the secondary data to the financial institution, using any technique, along with a request to deposit the check into a particular user account.

At 725, the financial institution may receive the image file pertaining to the check along with financial information pertaining to the account for depositing funds and any secondary data. In an implementation, the financial institution may determine that there are multiple user accounts in which to deposit the check. The accounts may be the same type of account, such as a checking account, or different types of accounts, such as checking, savings, or investment accounts. The user may make a selection among a list of accounts in which to deposit the check. The selection may be transmitted to the financial institution, which may process the deposit request according to the image file, the secondary data, and the selected account.

At 730, the financial institution may open the image file and parse financial information from the image file. The image file may be processed using any known technology to retrieve financial information regarding the check. Example technologies that may be used by the financial institution may include image editing, filtering to remove imagery except the check in the received image, image sharpening, and technologies to distinguish between the front and the back sides of the check.

At 735, after retrieving the financial information from the check in an electronic data representation form, the financial institution may determine whether the financial information such as the amount payable to the user, the account associated with the user to deposit funds, an account associated with a payor to debit funds, and a financial institution associated with the payor and/or the user may be valid. For example, the financial institution may include electronic devices such as computers, servers, databases, or the like that may be in communication with each other. The electronic devices may receive an electronic data representation and may perform an initial analysis on the quality of the data representation, the readability of the data representation, or the like. For example, the electronic devices may determine whether the account number, amount payable, or the like may be readable such that they may be parsed and processed by the financial institution to credit an account associated with the user and debit an account associated with the payor.

At 740, if the financial information is determined to be valid, the electronic data representation may be processed by the financial institution at 790, thereby depositing the check in the user's account. If the financial information is determined to be invalid at 740, then the user may be advised at 745. For example, the financial institution may transmit an email, a web message, an instant message, or the like to the user indicating that the financial information associated with the electronic data representation may be invalid. The user may determine how to proceed by selecting an option on the web message, replying to the email, or the like.

Thus, in an implementation, instructions on how the user would like to proceed may be requested from the user, such as whether the user would like to try the image deposit again (e.g., make another image file using the camera and send it to the financial institution) or whether the user would like assistance from a representative, for example. The user may indicate how they would like to proceed. If the user would like to try the image deposit again, processing may continue at 715 in an implementation.

If the user would like assistance, the financial information may be transferred to a representative for further review at 750. The representative, such as a customer service representative, a bank teller who may be located at a branch, a virtual bank teller who may be located remotely via an electronic device, or the like, may review the financial information associated with the electronic data representation to determine whether to allow the electronic data representation to be processed by the financial institution. For example, the initial analysis may require a certain quality requirement, a certain readability requirement, or the like, thus, leading to a high failure rate even though the electronic data representation may otherwise be valid. Thus, the representative may review the electronic data representation to determine whether the financial information may be readable and/or of a good enough quality to be processed. If so, the electronic data representation of the financial information may be processed by the financial institution at 790, thereby depositing the check in the user's account.

The user may receive a notice via email, facsimile, instant message, or mail, for example, that the check has been deposited into the selected account. In an implementation, if the check is not successfully deposited by image deposit, the financial institution may provide additional options to the user on how to redeem the check, such as mailing the check to the financial institution or the like.

In an implementation, the financial institution may receive a decision from a representative on whether to credit the funds to an account. For example, a representative such as a virtual or remote teller may make a decision such as to approve or deny processing of the electronic data representation. According to an embodiment, a virtual teller may fill in the invalid financial information. For example, the virtual teller may issue a decision to approve the electronic data representation and may fill in the financial information deemed invalid from the initial analysis based upon inspection or review by the teller. The financial institution may then receive the invalid information from the virtual bank teller such that the electronic data representation may be processed.

In an implementation, at 790, the financial institution may process the electronic data representation of the check. For example, the financial institution may credit the funds to an account associated with the individual if, based on the decision received from the representative, the financial information may be approved. Additionally, the financial institution may credit the funds to an account associated with the user if, based on the determination, the financial information may be valid. The credit may be a provisional credit, enabling the user to access the funds while the check is being cleared. A provisional credit may be voided if the bank determines that the transaction is erroneous and/or fraudulent. Additionally, to credit funds to the account, the bank may generate an Automated Clearinghouse (ACH) debit entry, substitute check, and/or electronic image. ACH transactions typically include payment instructions to debit and/or credit an account. Banks often employ ACH service providers to settle ACH transactions. Examples of ACH service providers include regional branches of the Federal Reserve and the Electronic Payments Network (EPN).

The ACH service provider may process the debit entry by identifying the account and bank from which the check may be drawn. The bank from which the check is drawn (i.e., the payor's bank) may be referred to as a receiving depository financial institution. If the payor's bank verifies the transaction, the ACH service provider may settle the transaction by debiting the payor's bank and crediting the user's bank. The payor's bank may then debit the payor's account.

Accordingly, a user, without regard to physical location, may access a system described herein, take images of a check, deposit that check into their account and have the funds immediately available (depending on the depository's clearance policies). The user would not have to wait for the mail to pick up their check, the check to get to the bank, the bank to deposit the check, and then have the funds available. The implementations described herein may be limited by the risk tolerance of the depository. If the depository is concerned with fraudulent presentment of the checks through these systems, they may restrict access to particular level of user, such as an "elite" level user. Though the term check has been used as representative of a negotiable instrument, the present discussion is not limited to checks and encompasses any negotiable instrument that a user may present to a depository.

Figure 8:
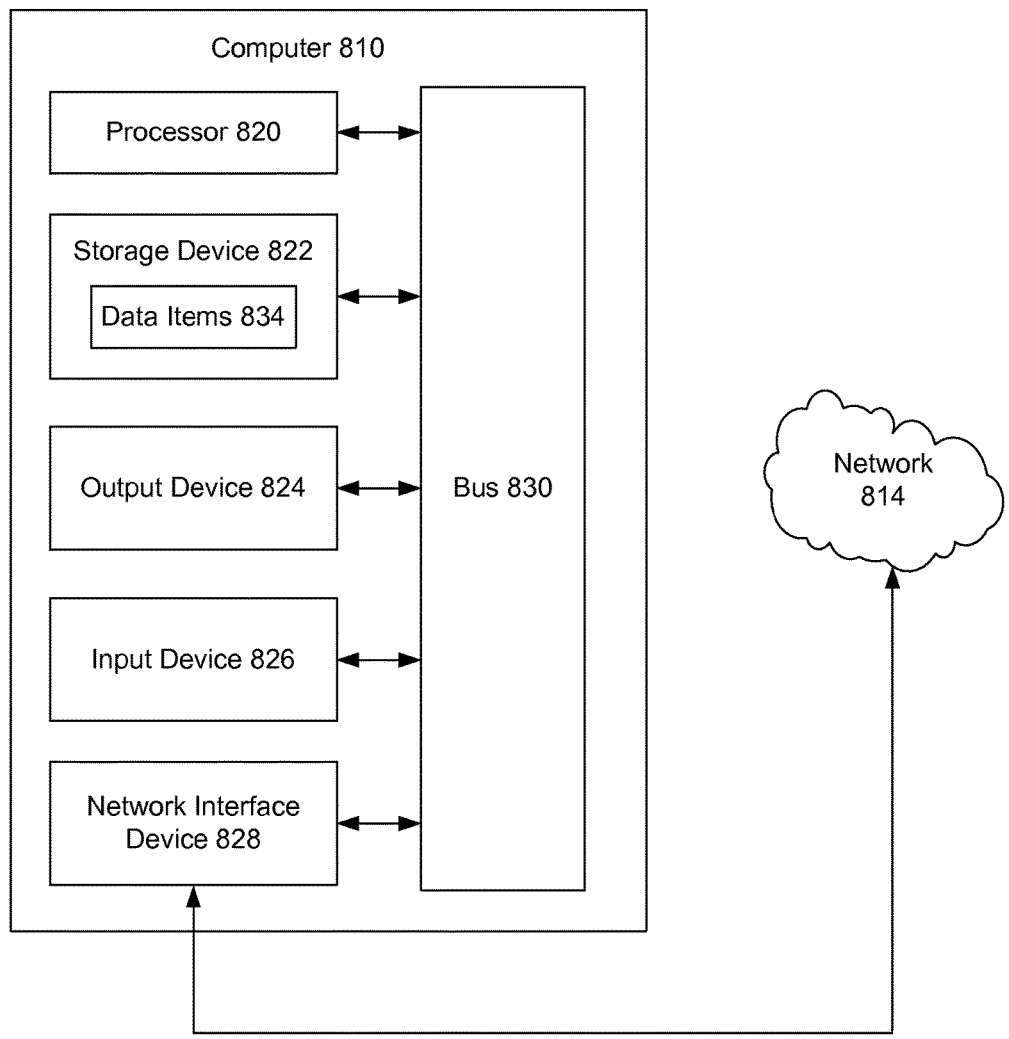
FIG. 8 is a block diagram of an example computing environment in which example embodiments and aspects may be implemented.

FIG. 8 is a block diagram of an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, a system 800 includes a computer 810 connected to a network 814. The computer 810 includes a processor 820, a storage device 822, an output device 824, an input device 826, and a network interface device 828, all connected via a bus 830. The processor 820 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 820 executes instructions and includes that portion of the computer 810 that controls the operation of the entire computer. Although not depicted in FIG. 8, the processor 820 typically includes a control unit that organizes data and program storage in memory and transfers data and other information between the various parts of the computer 810. The processor 820 receives input data from the input device 826 and the network 814 reads and stores code and data in the storage device 822 and presents data to the output device 824.

Although the computer 810 is shown to contain only a single processor 820 and a single bus 830, the disclosed embodiment applies equally to computers that may have multiple processors and to computers that may have multiple busses with some or all performing different functions in different ways.

The storage device 822 represents one or more mechanisms for storing data. For example, the storage device 822 may include read-only memory (ROM), RAM, magnetic disk storage media, optical storage media, flash memory devices, and/or other machine-readable media. In other embodiments, any appropriate type of storage device may be used. Although only one storage device 822 is shown, multiple storage devices and multiple types of storage devices may be present. Further, although the computer 810 is drawn to contain the storage device 822, it may be distributed across other computers, for example on a server.

The storage device 822 includes a controller (not shown in FIG. 8) and data items 834. The controller includes instructions capable of being executed on the processor 820 to carry out the functions as previously described herein with reference to FIGS. 1-7. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 822 may also contain additional software and data (not shown), which is not necessary to understand the invention. Although the controller and the data items 834 are shown to be within the storage device 822 in the computer 810, some or all of them may be distributed across other systems, for example on a server and accessed via the network 814.

The output device 824 is that part of the computer 810 that displays output to the user. The output device 824 may be a liquid crystal display (LCD) well-known in the art of computer hardware. In other embodiments, the output device 824 may be replaced with a gas or plasma-based flat-panel display or a traditional cathode-ray tube (CRT) display. In still other embodiments, any appropriate display device may be used. Although only one output device 824 is shown, in other embodiments any number of output devices of different types, or of the same type, may be present. In an embodiment, the output device 824 displays a user interface.

The input device 826 may be a keyboard, mouse or other pointing device, trackball, touchpad, touch screen, keypad, microphone, voice recognition device, or any other appropriate mechanism for the user to input data to the computer 810 and manipulate the user interface previously discussed. Although only one input device 826 is shown, in another embodiment any number and type of input devices may be present.

The network interface device 828 provides connectivity from the computer 810 to the network 814 through any suitable communications protocol. The network interface device 828 sends and receives data items from the network 814.

The bus 830 may represent one or more busses, e.g., USB, PCI, ISA (Industry Standard Architecture), X-Bus, EISA (Extended Industry Standard Architecture), or any other appropriate bus and/or bridge (also called a bus controller).

The computer 810 may be implemented using any suitable hardware and/or software, such as a personal computer or other electronic computing device. Portable computers, laptop or notebook computers, PDAs, pocket computers, appliances, telephones, and mainframe computers are examples of other possible configurations of the computer 810. For example, other peripheral devices such as audio adapters or chip programming devices, such as EPROM (Erasable Programmable Read-Only Memory) programming devices may be used in addition to, or in place of, the hardware already depicted.

The network 814 may be any suitable network and may support any appropriate protocol suitable for communication to the computer 810. In an embodiment, the network 814 may support wireless communications. In another embodiment, the network 814 may support hard-wired communications, such as a telephone line or cable. In another embodiment, the network 814 may support the Ethernet IEEE (Institute of Electrical and Electronics Engineers) 802.3x specification. In another embodiment, the network 814 may be the Internet and may support IP (Internet Protocol). In another embodiment, the network 814 may be a LAN or a WAN. In another embodiment, the network 814 may be a hotspot service provider network. In another embodiment, the network 814 may be an intranet. In another embodiment, the network 814 may be a GPRS (General Packet Radio Service) network. In another embodiment, the network 814 may be any appropriate cellular data network or cell-based radio network technology. In another embodiment, the network 814 may be an IEEE 802.11 wireless network. In still another embodiment, the network 814 may be any suitable network or combination of networks. Although one network 814 is shown, in other embodiments any number of networks (of the same or different types) may be present.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or use the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to using aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A processor-implemented method of depositing a negotiable instrument, comprising:
with a processor of a server of a financial institution in communication with a mobile device, the mobile device communicatively coupled to an image capture device, the processor:
delivering an application comprising a remote deposit processing component from the financial institution for instantiation on the mobile device communicatively coupled to the image capture device, the delivering of the application occurring at least partially after authenticating a user of the mobile device, the authenticating of the user, comprising:
receiving, from the mobile device, authentication information of the user of the mobile device for authenticating the user to the server of the financial institution; and
authenticating, through the authentication information, that the user is an authorized consumer of the financial institution;
instructing the application on the mobile device, after the authenticating of the user, to enable execution of the remote deposit processing component on the mobile device;
receiving, from the remote deposit processing component, an image file of the negotiable instrument, wherein the image file comprises an image of the negotiable instrument captured by the image capture device communicatively coupled to the mobile device of the user;
verifying that the image file is readable such that financial information may be obtained from the negotiable instrument;
obtaining the financial information pertaining to the negotiable instrument from the image file, wherein the financial information includes information regarding an account for depositing funds of the user; and
depositing funds of the negotiable instrument into the account based on the financial information pertaining to the negotiable instrument.

2. The method of claim 1, wherein the image file is received via an Internet connection or a wireless cellular transmission.

3. The method of claim 1, wherein the image file is received via email.

4. The method of claim 1, wherein the image of the negotiable instrument comprises first side of the negotiable instrument, and wherein the image file further comprises a second image comprising a second side of the negotiable instrument.

5. The method of claim 1, further comprising determining whether the financial information is invalid, and if so, transferring the financial information to a representative.

6. The method of claim 1, further comprising determining whether the financial information is invalid, and if so,
advising the user;
receiving a second image file from the user;
obtaining second financial information pertaining to the negotiable instrument from the second image file; and
depositing funds of the negotiable instrument into an account based on the second financial information pertaining to the negotiable instrument.

7. A computer-readable medium comprising:
computer-readable instructions for depositing a negotiable instrument, said computer-readable instructions comprising instructions that, when executed by a processor of a server of a financial institution, cause the processor to:
deliver an application comprising a remote deposit processing component from the financial institution for instantiation on a mobile device communicatively coupled to an image capture device, the delivering of the application occurring at least partially after authenticating a user of the mobile device, the authenticating of the user, comprising:
receive, from the mobile device, authentication information of the user of the mobile device for authenticating the user to the server of the financial institution; and
authenticate, through the authentication information, that the user is an authorized consumer of the financial institution;
instruct the application on the mobile device, after the authenticating of the user, to enable execution of the remote deposit processing component on the mobile device;
receive, from the remote deposit processing component, an image file of the negotiable instrument, wherein the image file comprises an image of the negotiable instrument captured by the image capture device communicatively coupled to the mobile device of the user;
verify that the image file is readable such that financial information may be obtained from the negotiable instrument;
obtain the financial information pertaining to the negotiable instrument from the image file, wherein the financial information includes information regarding an account for depositing funds of the user; and
deposit funds of the negotiable instrument identified by the financial information obtained from the negotiable instrument into an account held by the user at the financial institution.

8. The computer-readable medium of claim 7, wherein the image file is received via an Internet connection or a wireless cellular transmission.

9. The computer-readable medium of claim 7, wherein the image file is received via email.

10. The computer-readable medium of claim 7, wherein the image of the negotiable instrument comprises first side of the negotiable instrument, and wherein the image file further comprises a second image comprising a second side of the negotiable instrument.

11. The computer-readable medium of claim 7, further comprising instructions that determine whether the financial information is invalid, and if so, transfer the financial information to a representative.

12. The computer-readable medium of claim 7, further comprising instructions that determine whether the financial information is invalid, and if so,
advise the user;
receive a second image file from the user;
obtain second financial information pertaining to the negotiable instrument from the second image file; and deposit funds of the negotiable instrument into an account based on the second financial information pertaining to the negotiable instrument.

13. A system for depositing a negotiable instrument, comprising:
a server of a financial institution, the server comprising:
a memory storing instructions;
a processor disposed in communication with said memory, the processor configured to execute the instructions to:
deliver an application comprising a remote deposit processing component from the financial institution for instantiation on a mobile device communicatively coupled to an image capture device, the delivering of the application occurring at least partially after authenticating a user of the mobile device, the authenticating of the user, comprising:
receive, from the mobile device, authentication information of the user of the mobile device for authenticating the user to the server of the financial institution; and
authenticate, through the authentication information, that the user is an authorized consumer of the financial institution;
instruct the application on the mobile device, after the authenticating of the user, to enable execution of the remote deposit processing component on the mobile device;
receive, from the remote deposit processing component, an image file of the negotiable instrument, wherein the image file comprises an image of the negotiable instrument captured by the image capture device communicatively coupled to the mobile device of the user;
verify that the image file is readable such that financial information may be obtained from the negotiable instrument;
obtain the financial information pertaining to the negotiable instrument from the image file, wherein the financial information includes information regarding an account for depositing funds of the user; and
deposit funds of the negotiable instrument identified by the financial information obtained from the negotiable instrument into an account held by the user at the financial institution.

14. The system of claim 13, wherein the image file is received via an Internet connection or a wireless cellular transmission.

15. The system of claim 13, wherein the image file is received via email.

16. The system of claim 13, wherein the image of the negotiable instrument comprises first side of the negotiable instrument, and wherein the image file further comprises a second image comprising a second side of the negotiable instrument.

17. The system of claim 13, further comprising at least one subsystem that determines whether the financial information is invalid, and if so, transfers the financial information to a representative.

18. The system of claim 13, further comprising at least one subsystem that determines whether the financial information is invalid, and if so,
advises the user;
receives a second image file from the user;
obtains second financial information pertaining to the negotiable instrument from the second image file; and
deposits funds of the negotiable instrument into an account based on the second financial information pertaining to the negotiable instrument.

19. A processor-implemented method of depositing a negotiable instrument, comprising:
with a processor of a mobile device communicatively coupled to an image capture device, the mobile device in communication with a server of a financial institution, the processor:
receiving an application comprising a remote deposit processing component from the financial institution for instantiation on the mobile device communicatively coupled to the image capture device, the receiving of the application occurring at least partially after authenticating a user of the mobile device, the authenticating of the user, comprising
sending, via the application on the mobile device, authentication information to the financial institution to authenticate that the user of the mobile device is an authorized consumer of the financial institution;
receiving an instruction from the financial institution to enable execution of the remote deposit processing component on the mobile device;
capturing an image of a negotiable instrument via the image capture device communicatively coupled to the mobile device;
performing a cleaning procedure via the remote deposit processing component on the captured image of the negotiable instrument, the cleaning procedure including deskewing and dewarping the captured image of the negotiable instrument;
sending the cleaned image of the negotiable instrument to the financial institution via the remote deposit processing component; and
receiving an indication including information related to a status of depositing the negotiable instrument.

* * * * *